(12) United States Patent
Wang et al.

(10) Patent No.: US 12,470,986 B2
(45) Date of Patent: Nov. 11, 2025

(54) METHOD AND DEVICE FOR CONFIGURING DATA TRANSMISSION

(71) Applicant: Samsung Electronics Co., Ltd., Suwon-si (KR)

(72) Inventors: Weiwei Wang, Beijing (CN); Hong Wang, Beijing (CN); Lixiang Xu, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 631 days.

(21) Appl. No.: 17/881,133

(22) Filed: Aug. 4, 2022

(65) Prior Publication Data

US 2023/0042454 A1 Feb. 9, 2023

(30) Foreign Application Priority Data

Aug. 4, 2021 (CN) .......................... 202110893418.X

(51) Int. Cl.
*H04W 36/00* (2009.01)

(52) U.S. Cl.
CPC ............................. *H04W 36/0033* (2013.01)

(58) Field of Classification Search
CPC ..... H04W 76/27; H04W 76/30; H04W 76/19; H04W 36/0033; H04W 74/0833
See application file for complete search history.

(56) References Cited

U.S. PATENT DOCUMENTS

| 2014/0161447 A1 | 6/2014 | Graves et al. | |
| 2022/0007423 A1* | 1/2022 | Agiwal | H04W 76/27 |
| 2022/0022266 A1* | 1/2022 | Agiwal | H04W 76/28 |
| 2022/0046749 A1* | 2/2022 | Lin | H04W 76/30 |
| 2022/0210860 A1* | 6/2022 | Chin | H04W 72/23 |
| 2022/0225472 A1* | 7/2022 | Kim | H04W 36/0033 |
| 2022/0361276 A1* | 11/2022 | Jeon | H04W 28/0278 |

(Continued)

FOREIGN PATENT DOCUMENTS

| EP | 3 550 739 B1 | 6/2021 |
| WO | 2021/150015 A1 | 7/2021 |

OTHER PUBLICATIONS

TS 38.473, V16.6.0, 3rd Generation Partnership Project; Technical Specification Group Radio Access Network; NG-RAN; F1 application protocol (F1AP) (Release 16), Jul. 2021.

(Continued)

*Primary Examiner* — Allahyar Kasraian
(74) *Attorney, Agent, or Firm* — Jefferson IP Law, LLP

(57) ABSTRACT

The disclosure relates to a fifth generation (5G) or sixth generation (6G) communication system for supporting a higher data transmission rate. A method and a device for configuring data transmission are provided. The method includes transmitting a first message to a second node, the first message being used for the first node to provide configuration information for a user to the second node, or used for the first node to request the configuration information for the user from the second node, and/or receiving a second message from the second node, the second message being used for the second node to provide the configuration information for the user to the first node, or used for the second node to request the configuration information for the user from the first node, to avoid unnecessary signaling overhead.

13 Claims, 25 Drawing Sheets

(56) References Cited

U.S. PATENT DOCUMENTS

| | | | | |
|---|---|---|---|---|
| 2023/0087615 | A1* | 3/2023 | Park | H04W 72/231 |
| | | | | 370/329 |
| 2023/0164628 | A1* | 5/2023 | Zou | H04W 76/11 |
| | | | | 370/329 |
| 2023/0199900 | A1* | 6/2023 | Park | H04W 76/27 |
| | | | | 370/329 |
| 2023/0413207 | A1* | 12/2023 | Yue | H04W 56/0045 |
| 2024/0129987 | A1* | 4/2024 | Wang | H04W 76/30 |
| 2024/0298302 | A1* | 9/2024 | Zheng | H04W 56/0035 |

OTHER PUBLICATIONS

TS 38.463, V16.6.0, 3rd Generation Partnership Project; Technical Specification Group Radio Access Network; NG-RAN; E1 Application Protocol (E1AP) (Release 16), Jul. 2021.

TS 36.331, V16.5.0, 3rd Generation Partnership Project; Technical Specification Group Radio Access Network; Evolved Universal Terrestrial Radio Access (E-UTRA); Radio Resource Control (RRC); Protocol specification (Release 16), Jun. 2021.

TS 38.331, V16.5.0, 3rd Generation Partnership Project; Technical Specification Group Radio Access Network; NR; Radio Resource Control (RRC) protocol specification (Release 16), Jun. 2021.

TS 38.423, V16.6.0, 3rd Generation Partnership Project; Technical Specification Group Radio Access Network; NG-RAN; Xn application protocol (XnAP) (Release 16), Jul. 2021.

3GPP, 3rd Generation Partnership Project; Technical Specification Group Radio Access Network; NG-RAN; Architecture description (Release 16), TS 38.401 V16.6.0, Jul. 2021.

ZTE, Summary of Offline Discussion on SDT, R3-210979, 3GPP TSG-RAN WG3 #111-e, Jan. 25-Feb. 4, 2021.

Intel Corporation, Rach selection and User plane aspects with and without anchor relocation, 3GPP TSG-RAN WG2 Meeting #112-e, Electronic meeting, Nov. 2-13, 2020, R2-2008994.

Huawei et al., Correction on SDT, 3GPP TSG-RAN WG3 Meeting #116-e, E-meeting, May 9-May 19, 2022 R3-223845.

International Search Report dated Nov. 4, 2022, issued in International Patent Application No. PCT/KR2022/011558.

Intel Corporation, Radio bearer configuration for SDT considering UE context relocation and CU/DU split, 3GPP TSG RAN WG2 Meeting #111-e, R2-2006714, Aug. 17-28, 2020.

Qualcomm Incorporated, Discussion on RACH based NR small data transmission, 3GPP TSG-RAN WG2 Meeting#113, R2-2103433, Apr. 12-20, 2021.

Extended European Search Report dated Oct. 28, 2024, issued in European Application No. 22853487.1-1215.

* cited by examiner

METHOD AND DEVICE FOR CONFIGURING DATA TRANSMISSION

CROSS-REFERENCE TO RELATED APPLICATION(S)

This application is based on and claims under 35 U.S.C. § 119(a) of a Chinese patent application number 202110893418.X, filed on Aug. 4, 2021, in the Chinese Intellectual Property Office, the disclosure of which is incorporated by reference herein in its entirety.

BACKGROUND

1. Field

The disclosure relates to the technical field of wireless communication. More particularly, the disclosure relates to a method and a device for configuring data transmission.

2. Description of Related Art

Fifth generation (5G) mobile communication technologies define broad frequency bands such that high transmission rates and new services are possible, and can be implemented not only in "Sub 6 gigahertz (GHz)" bands such as 3.5 GHz, but also in "Above 6 GHz" bands referred to as mmWave including 28 GHz and 39 GHz. In addition, it has been considered to implement sixth generation (6G) mobile communication technologies (referred to as Beyond 5G systems) in terahertz (THz) bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile Broadband (eMBB), Ultra Reliable Low Latency Communications (URLLC), and massive Machine-Type Communications (mMTC), there has been ongoing standardization regarding beamforming and massive multiple-input multiple-output (MIMO) for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BandWidth Part (BWP), new channel coding methods such as a Low Density Parity Check (LDPC) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as Vehicle-to-everything (V2X) for aiding driving determination by autonomous vehicles based on information regarding positions and states of vehicles transmitted by the vehicles and for enhancing user convenience, New Radio Unlicensed (NR-U) aimed at system operations conforming to various regulation-related requirements in unlicensed bands, new radio (NR) user equipment (UE) Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, Integrated Access and Backhaul (IAB) for providing a node for network service area expansion by supporting a wireless backhaul link and an access link in an integrated manner, mobility enhancement including conditional handover and Dual Active Protocol Stack (DAPS) handover, and two-step random access for simplifying random access procedures (2-step random access channel (RACH) for new radio (NR)). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting Augmented Reality (AR), Virtual Reality (VR), Mixed Reality (MR) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, meta-material-based lenses and antennas for improving coverage of terahertz band signals, high-dimensional space multiplexing technology using Orbital Angular Momentum (OAM), and Reconfigurable Intelligent Surface (RIS), but also full-duplex technology for increasing frequency efficiency of 6G mobile communication technologies and improving system networks, AI-based communication technology for implementing system optimization by utilizing satellites and Artificial Intelligence (AI) from the design stage and internalizing end-to-end AI support functions, and next-generation distributed computing technology for implementing services at levels of complexity exceeding the limit of UE operation capability by utilizing ultra-high-performance communication and computing resources.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and a device for configuring data transmission.

Additional aspects will be set forth in part in the description which follows and, in part, will be apparent from the description, or may be learned by practice of the presented embodiments.

In accordance with an aspect of the disclosure, a communication method performed by a first node is provided. The communication method includes transmitting a first message to a second node, where the first message is used for the first node to provide configuration information for a user to the second node, or used for the first node to request the configuration information for the user from the second node, and/or receiving a second message from the second node, where the second message is used for the second node to provide the configuration information for the user to the first node, or used for the second node to request the configuration information for the user from the first node.

According to an embodiment of the disclosure, the first message includes at least one of identification information related to the user, first indication information related to the user, first information related to security, a first container related to user messages, information related to user context, first indication information of configured grant request, first indication information of release of the user, first indication information of termination of small data transmission, first indication information of no small data, and first time information.

According to an embodiment of the disclosure, the identification information related to the user includes at least one of identification information of the user for small data transmission, first identification information of the user, identification information of inactivity, user context identification information, integrity protection information, and identification information of a new cell.

According to an embodiment of the disclosure, the second message includes at least one of Public Land Mobile Network (PLMN) identification information, second indication information of a user state, first user message, fourth indication information related to the user, second information related to configured grant, second indication information of termination of small data transmission, second indication information of no small data, and first lower layer configuration information.

According to an embodiment of the disclosure, the method further includes transmitting a message including a paging message to the second node.

According to an embodiment of the disclosure, the method further includes transmitting, to the second node, a message for transmission of a message for configuring the user generated by the first node.

According to an embodiment of the disclosure, the method further includes transmitting, to the second node, a message for transmission of a context of the user, receiving, from a second node, a message for transmission of a user message generated by the second node, and transmitting, to the second node, a message for transmission of a message for configuring the user generated by the first node.

In accordance with an aspect of the disclosure, a method for configuring data transmission by a second node is provided. The method includes receiving a first message from a first node, where the first message is used for the first node to provide configuration information for a user to the second node, or used for the first node to request the configuration information for the user from the second node, and/or transmitting a second message to the first node, where the second message is used for the second node to provide the configuration information for the user to the first node, or used for the second node to request the configuration information for the user from the first node.

According to an embodiment of the disclosure, the first message includes at least one of identification information related to the user, first indication information related to the user, first information related to security, a first container related to user messages, information related to user context, first indication information of configured grant request, first indication information of release of the user, first indication information of termination of small data transmission, first indication information of no small data, and first time information.

According to an embodiment of the disclosure, the identification information related to the user includes at least one of identification information of the user for small data transmission, first identification information of the user, identification information of inactivity, user context identification information, integrity protection information, and identification information of a new cell.

According to an embodiment of the disclosure, the second message includes at least one of Public Land Mobile Network (PLMN) identification information, second indication information of a user state, first user message, fourth indication information related to the user, second information related to configured grant, second indication information of termination of small data transmission, second indication information of no small data, and first lower layer configuration information.

According to an embodiment of the disclosure, the method further includes transmitting a message including a connection release message to the user, and transmitting a message including a paging message to the user.

According to an embodiment of the disclosure, the method further includes receiving a message including a paging message from the first node, and transmitting a message including the paging message to the user.

According to an embodiment of the disclosure, the method further includes receiving, from the first node, a message for transmission of a message for configuring the user generated by the first node, and transmitting, to the user, the message for configuring the user.

According to an embodiment of the disclosure, the method further includes receiving, from the second node, a message for transmission of a context of the user, transmitting, to the second node, a message for transmission of a user message generated by the second node, receiving, from a second node, a message for transmission of a message for configuring the user generated by the first node, and transmitting, to the user, the message for configuring the user.

In accordance with another aspect of the disclosure, a communication method performed by a third node is provided. The communication method includes transmitting a third message to a fourth node, where the third message is used for the third node to provide configuration information for a user to the fourth node, and/or receiving a fourth message from the fourth node, where the fourth message is used for the fourth node to provide the configuration information for the user to the third node.

According to an embodiment of the disclosure, the third message includes at least one of identification information of the user, identification information of the user for small data transmission, fifth indication information related to the user, a second container related to user messages, second indication information of configured grant request, first indication information of lower layer configuration request, second time information, third indication information of termination of small data transmission, third indication information of no small data, and indication information of delay transmission.

According to an embodiment of the disclosure, the fourth message includes at least one of identification information of the user, seventh indication information related to the user, a third container related to user messages, indication information of radio bearers, fourth information related to configured grant, fourth indication information of termination of small data transmission, fourth indication information of no small data, and second lower layer configuration information.

In accordance with another aspect of the disclosure, a method for configuring data transmission by a fourth node is provided. The method includes receiving a third message from a third node, where the third message is used for the third node to provide configuration information for a user to the fourth node, and/or transmitting a fourth message to the third node, where the fourth message is used for the fourth node to provide the configuration information for the user to the third node.

According to an embodiment of the disclosure, the third message includes at least one of identification information of the user, identification information of the user for small data transmission, fifth indication information related to the user, a second container related to user messages, second indication information of configured grant request, first indication information of lower layer configuration request, second time information, third indication information of termination of small data transmission, third indication information of no small data, and indication information of delay transmission.

According to an embodiment of the disclosure, the fourth message includes at least one of identification information of the user, seventh indication information related to the user, a third container related to user messages, indication information of radio bearers, fourth information related to configured grant, fourth indication information of termination of small data transmission, fourth indication information of no small data, and second lower layer configuration information.

In accordance with another aspect of the disclosure, a communication method performed by a fifth node is provided. The communication method includes transmitting a fifth message to a sixth node, where the fifth message is used to perform, for the sixth node, a configuration related to small data transmission or a configuration of a connected state, and/or receiving a sixth message from the sixth node, where the sixth message is used to indicate a behavior of the sixth node related to the small data transmission.

According to an embodiment of the disclosure, the fifth message includes at least one of ninth indication information related to the user, fourth information related to security, fifth indication information of termination of the small data transmission, fifth indication information of no small data, and a fourth container related to user messages.

According to an embodiment of the disclosure, the sixth message includes at least one of tenth indication information of arrival of non-small data, tenth indication information of non-small data transmission, tenth indication information of starting of a connection resume procedure, tenth indication information of entering of the connected state, sixth indication information of termination of the small data transmission, and sixth indication information of no small data.

In accordance with another aspect of the disclosure, a method for performing data transmission by a sixth node is provided. The method includes receiving a fifth message from a fifth node, where the fifth message is used to perform, for the sixth node, a configuration related to small data transmission or a configuration of a connected state, and/or transmitting a sixth message to the fifth node, where the sixth message is used to indicate a behavior of the sixth node related to the small data transmission.

According to an embodiment of the disclosure, the fifth message includes at least one of ninth indication information related to the user, fourth information related to security, fifth indication information of termination of the small data transmission, fifth indication information of no small data; and a fourth container related to user messages.

According to an embodiment of the disclosure, the sixth message includes at least one of tenth indication information of arrival of non-small data, tenth indication information of non-small data transmission, tenth indication information of starting of a connection resume procedure, tenth indication information of entering of the connected state, sixth indication information of termination of the small data transmission, and sixth indication information of no small data.

In accordance with another aspect of the disclosure, a node device is provided. The node device includes a transceiver configured to transmit and receive signals, a processor, and a memory having stored therein instructions executable by the processor that, when executed by the processor, cause the processor to perform the aforementioned methods.

In accordance with another aspect of the disclosure, a user equipment (UE) is provided. The UE includes a transceiver configured to transmit and receive signals, a processor, and a memory having stored therein instructions executable by the processor that, when executed by the processor, cause the processor to perform the aforementioned methods.

The methods according to the embodiments of the disclosure allow the user to transmit small data in an inactive state, thereby avoiding some unnecessary signaling overhead.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION

The following description with reference to the accompanying drawings is provided to facilitate a comprehensive understanding of various embodiments of the disclosure defined by the claims and their equivalents. This description includes various specific details to facilitate understanding but should only be considered as exemplary. Accordingly, those skilled in the art will recognize that various changes and modifications can be made to the various embodiments described herein without departing from the scope and spirit of the disclosure. In addition, description of well-known functions and constructions may be omitted for clarity and conciseness.

The terms and words used in the following description and claims are not limited to the bibliographical meanings, but, are merely used by the inventors to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It should be understood that singular forms of "a", "an" and "the" include plural references, unless the context clearly indicates otherwise. Thus, for example, reference to "a component surface" includes reference to one or more of such surfaces.

The terms "include" or "may include" refer to the existence of corresponding disclosed functions, operations or components that can be used in various embodiments of the disclosure, rather than limiting the existence of one or more additional functions, operations or features. In addition, the terms "include" or "have" can be interpreted to indicate certain characteristics, numbers, steps, operations, constituent elements, components or combinations thereof, but should not be interpreted to exclude the possibility of one or more other characteristics, numbers, steps, operations, constituent elements, components or combinations thereof.

The terms "or" used in various embodiments of the disclosure includes any listed terms and all combinations thereof. For example, "A or B" may include A, B, or both A and B.

Unless otherwise defined, all terms (including technical terms or scientific terms) used in this disclosure have the same meaning as those described in this disclosure and understood by those skilled in the art. Common terms as defined in dictionaries are interpreted to have meanings consistent with the context in the related technical field, and they should not be interpreted in an idealized or overly formal way unless explicitly so defined in the disclosure.

Figure 1:
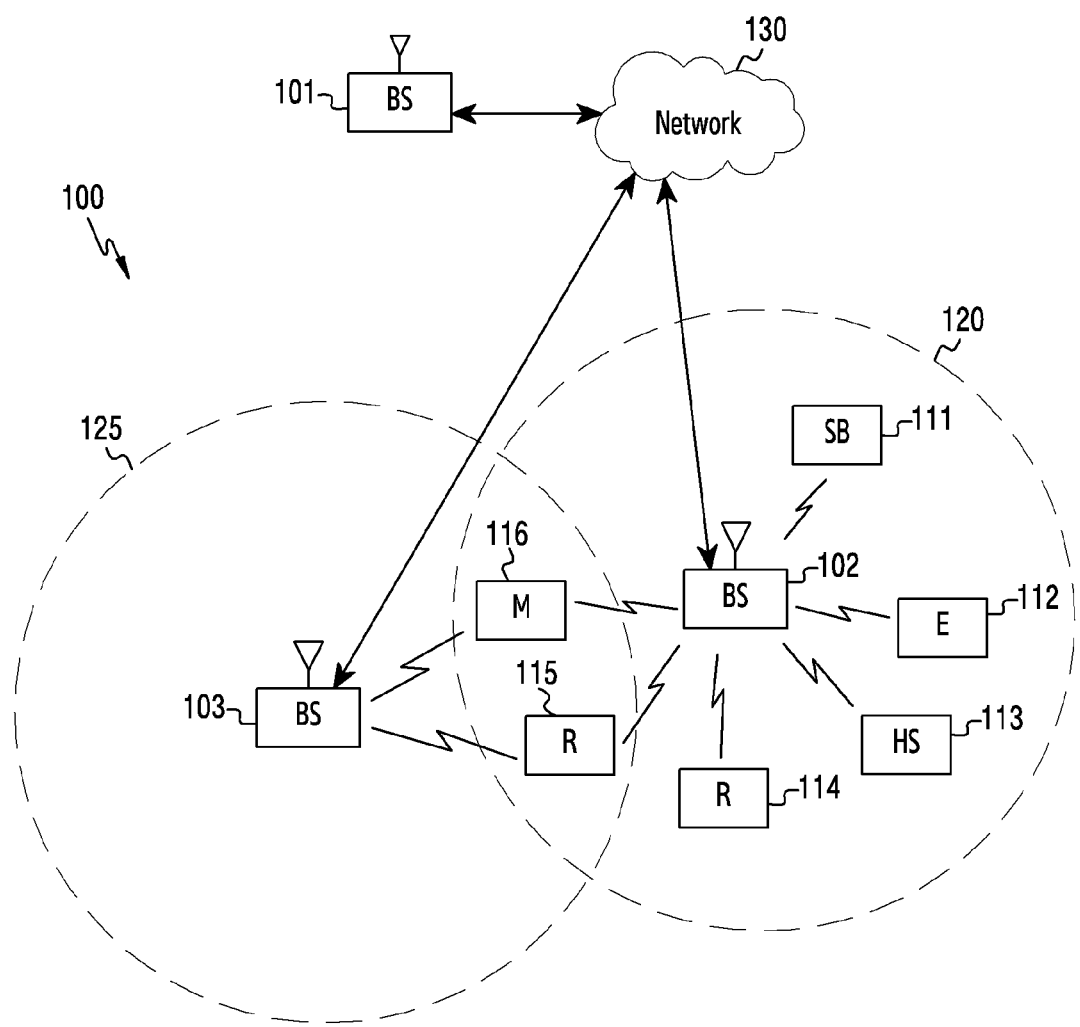
FIG. 1 illustrates a schematic diagram of an example wireless network according to an embodiment of the disclosure.

FIG. 1 illustrates an example wireless network according to an embodiment of the disclosure. The embodiment of the wireless network shown in FIG. 1 is for illustration only. Other embodiments of the wireless network can be used without departing from the scope of the disclosure.

Referring to FIG. 1, a wireless network 100 includes a gNodeB (gNB) 101, a gNB 102, and a gNB 103. The gNB 101 communicates with gNB 102 and gNB 103. The gNB 101 also communicates with at least one Internet Protocol (IP) network 130, such as the Internet, a private IP network, or other data networks.

Depending on a type of the network, other terms such as "base station (BS)" or "access point" can be used instead of "gNodeB" or "gNB". For convenience, the terms "gNodeB" and "gNB" are used in this patent document to refer to network infrastructure components that provide wireless access for remote terminals. And, depending on the type of the network, other terms such as "mobile station", "user station", "remote terminal", "wireless terminal" or "user apparatus" can be used instead of "user equipment" or "UE". For example, the terms "terminal", "user equipment" and "UE" may be used in this patent document to refer to remote wireless devices that wirelessly access the gNB, no matter whether the UE is a mobile device (such as a mobile phone or a smart phone) or a fixed device (such as a desktop computer or a vending machine).

The gNB 102 provides wireless broadband access to the network 130 for a first plurality of User Equipments (UEs) within a coverage area 120 of gNB 102. The first plurality of UEs include a UE 111, which may be located in a Small Business (SB); a UE 112, which may be located in an enterprise (E); a UE 113, which may be located in a WiFi Hotspot (HS); a UE 114, which may be located in a first residence (R); a UE 115, which may be located in a second residence (R); a UE 116, which may be a mobile device (M), such as a cellular phone, a wireless laptop computer, a wireless PDA, etc. The gNB 103 provides wireless broadband access to network 130 for a second plurality of UEs within a coverage area 125 of gNB 103. The second plurality of UEs include the UE 115 and the UE 116. In some embodiments, one or more of gNBs 101-103 can communicate with each other and with UEs 111-116 using 5G, Long Term Evolution (LTE), long term evolution advanced (LTE-A), worldwide interoperability for microwave access (WiMAX) or other advanced wireless communication technologies.

The dashed lines show approximate ranges of the coverage areas 120 and 125, and the ranges are shown as approximate circles merely for illustration and explanation purposes. It should be clearly understood that the coverage areas associated with the gNBs, such as the coverage areas 120 and 125, may have other shapes, including irregular shapes, depending on configurations of the gNBs and changes in the radio environment associated with natural obstacles and man-made obstacles.

As will be described in more detail below, one or more of gNB 101, gNB 102, and gNB 103 include a 2D antenna array as described in embodiments of the disclosure. In some embodiments, one or more of gNB 101, gNB 102, and gNB 103 support codebook designs and structures for systems with 2D antenna arrays.

Although FIG. 1 illustrates an example of the wireless network 100, various changes can be made to FIG. 1. The wireless network 100 can include any number of gNBs and any number of UEs in any suitable arrangement, for example. Furthermore, gNB 101 can directly communicate with any number of UEs and provide wireless broadband access to the network 130 for those UEs. Similarly, each gNB 102-103 can directly communicate with the network 130 and provide direct wireless broadband access to the network 130 for the UEs. In addition, gNB 101, 102 and/or 103 can provide access to other or additional external networks, such as external telephone networks or other types of data networks.

Figure 2A:
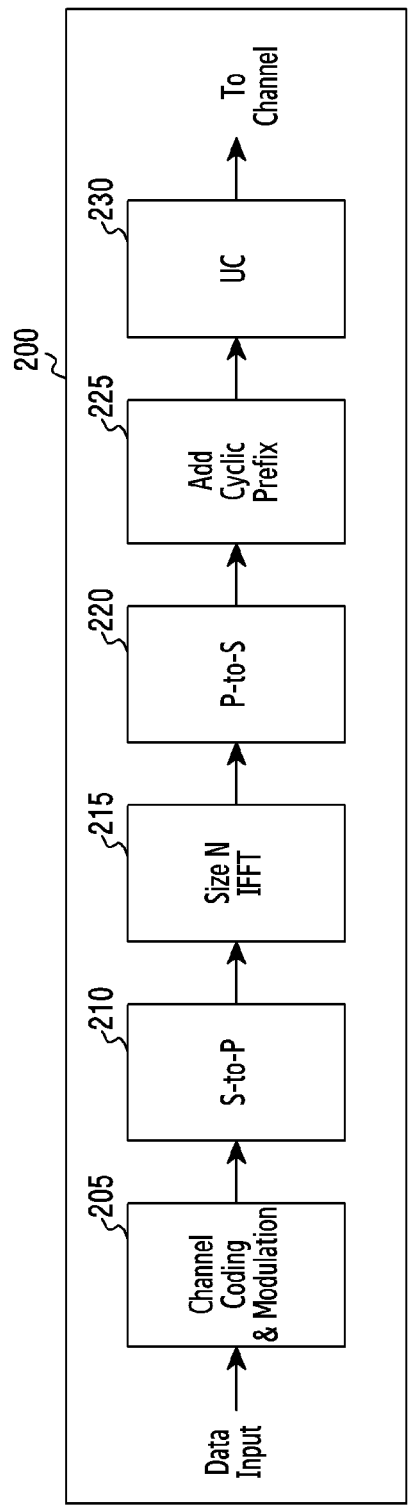
FIGS. 2A and 2B illustrate example wireless transmission and reception paths according to various embodiments of the disclosure.
Figure 2B:
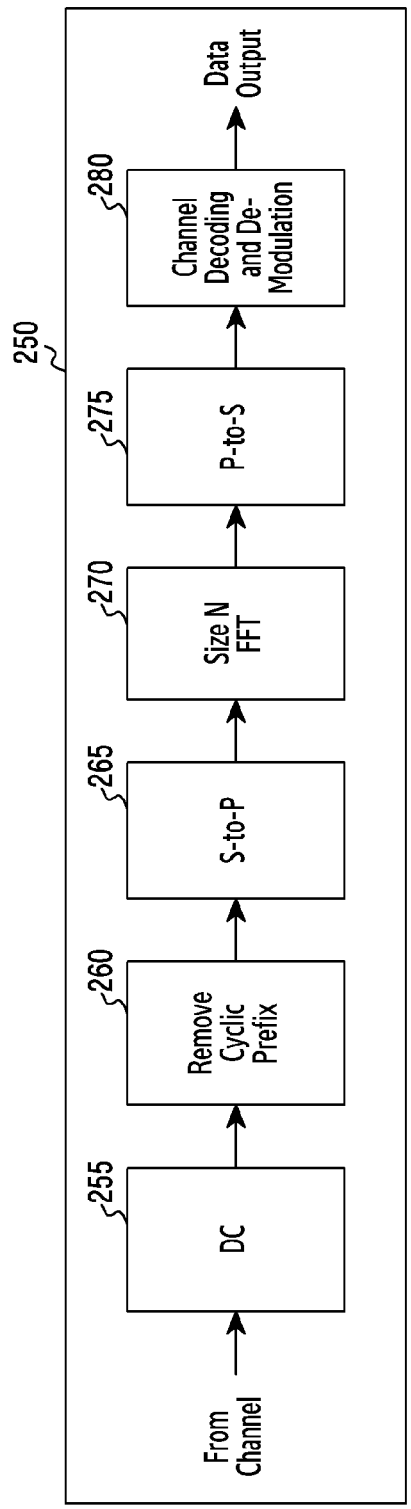

FIGS. 2A and 2B illustrate example wireless transmission and reception paths according to various embodiments of the disclosure. In the following description, a transmission path 200 can be described as being implemented in a gNB, such as gNB 102, and a reception path 250 can be described as being implemented in a UE, such as UE 116. However, it should be understood that the reception path 250 can be implemented in a gNB and the transmission path 200 can be implemented in a UE. In some embodiments, the reception path 250 is configured to support codebook designs and structures for systems with 2D antenna arrays as described in embodiments of the disclosure.

The transmission path 200 includes a channel coding and modulation block 205, a Serial-to-Parallel (S-to-P) block 210, a size N Inverse Fast Fourier Transform (IFFT) block 215, a Parallel-to-Serial (P-to-S) block 220, a cyclic prefix addition block 225, and an up-converter (UC) 230. The reception path 250 includes a down-converter (DC) 255, a cyclic prefix removal block 260, a Serial-to-Parallel (S-to-P) block 265, a size N Fast Fourier Transform (FFT) block 270, a Parallel-to-Serial (P-to-S) block 275, and a channel decoding and demodulation block 280.

In the transmission path 200, the channel coding and modulation block 205 receives a set of information bits, applies coding (such as Low Density Parity Check (LDPC) coding), and modulates the input bits (such as using Quadrature Phase Shift Keying (QPSK) or Quadrature Amplitude Modulation (QAM)) to generate a sequence of frequency-domain modulated symbols. The Serial-to-Parallel (S-to-P) block 210 converts (such as demultiplexes) serial modulated symbols into parallel data to generate N parallel symbol streams, where N is a size of the IFFT/FFT used in gNB 102 and UE 116. The size N IFFT block 215 performs IFFT operations on the N parallel symbol streams to generate a time domain output signal. The Parallel-to-Serial block 220 converts (such as multiplexes) parallel time domain output symbols from the Size N IFFT block 215 to generate a serial time domain signal. The cyclic prefix addition block 225 inserts a cyclic prefix into the time domain signal. The up-converter 230 modulates (such as up-converts) the output of the cyclic prefix addition block 225 to an RF frequency for transmission via a wireless channel. The signal can also be filtered at a baseband before switching to the RF frequency.

The RF signal transmitted from gNB 102 arrives at UE 116 after passing through the wireless channel, and operations in reverse to those at gNB 102 are performed at UE 116. The down-converter 255 down-converts the received signal to a baseband frequency, and the cyclic prefix removal block 260 removes the cyclic prefix to generate a serial time domain baseband signal. The Serial-to-Parallel block 265 converts the time domain baseband signal into a parallel time domain signal. The Size N FFT block 270 performs an FFT algorithm to generate N parallel frequency-domain signals. The Parallel-to-Serial block 275 converts the parallel frequency-domain signal into a sequence of modulated data symbols. The channel decoding and demodulation block 280 demodulates and decodes the modulated symbols to recover the original input data stream.

Each of gNBs 101-103 may implement the transmission path 200 similar to that for transmitting to UEs 111-116 in the downlink, and may implement the reception path 250 similar to that for receiving from UEs 111-116 in the uplink. Similarly, each of UEs 111-116 may implement the transmission path 200 for transmitting to gNBs 101-103 in the uplink, and may implement the reception path 250 for receiving from gNBs 101-103 in the downlink.

Each of the components in FIGS. 2A and 2B can be implemented using only hardware, or using a combination of hardware and software/firmware. As a specific example, at least some of the components in FIGS. 2A and 2B may be implemented in software, while other components may be implemented in configurable hardware or a combination of software and configurable hardware. For example, the FFT block 270 and IFFT block 215 may be implemented as configurable software algorithms, in which the value of the size N may be modified according to the implementation.

Furthermore, although described as using FFT and IFFT, this is only illustrative and should not be interpreted as limiting the scope of the disclosure. Other types of transforms can be used, such as Discrete Fourier transform (DFT) and Inverse Discrete Fourier Transform (IDFT) functions. It should be understood that for DFT and IDFT functions, the value of variable N may be any integer (such as 1, 2, 3, 4, etc.), while for FFT and IFFT functions, the value of variable N may be any integer which is a power of 2 (such as 1, 2, 4, 8, 16, etc.).

Although FIGS. 2A and 2B illustrate examples of wireless transmission and reception paths, various changes may be made to FIGS. 2A and 2B. For example, various components in FIGS. 2A and 2B can be combined, further subdivided or omitted, and additional components can be added according to specific requirements. Furthermore, FIGS. 2A and 2B are intended to illustrate examples of types of transmission and reception paths that can be used in a wireless network. Any other suitable architecture can be used to support wireless communication in a wireless network.

Figure 3A:
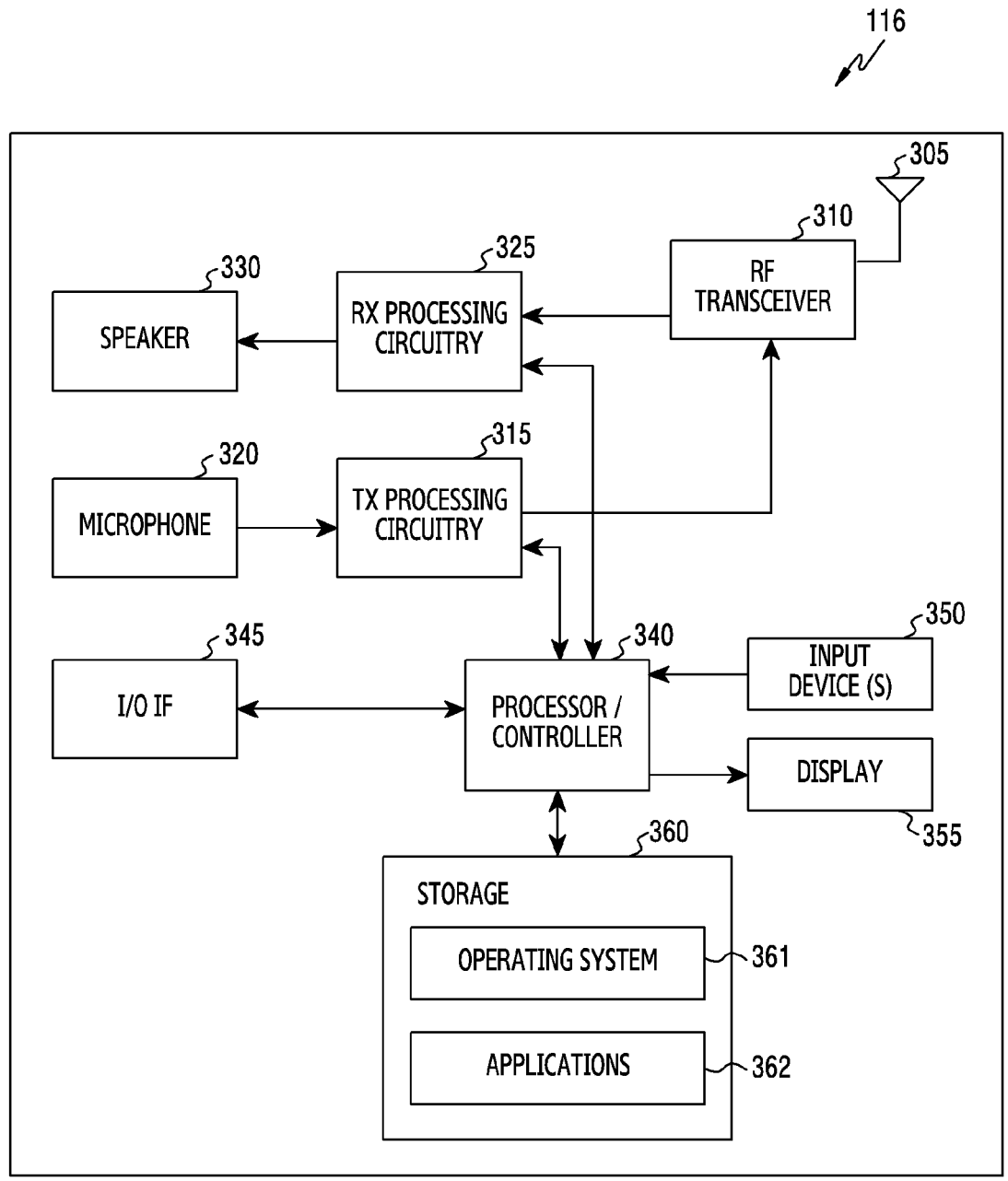
FIG. 3A illustrates an example user equipment (UE) according to an embodiment of the disclosure.

FIG. 3A illustrates an example UE according to the disclosure. The embodiment of UE 116 shown in FIG. 3A is for illustration only, and UEs 111-115 of FIG. 1 can have the same or similar configuration. However, a UE has various configurations, and FIG. 3A does not limit the scope of the disclosure to any specific implementation of the UE.

UE 116 includes an antenna 305, a radio frequency (RF) transceiver 310, a transmission (TX) processing circuit 315, a microphone 320, and a reception (RX) processing circuit 325. UE 116 also includes a speaker 330, a processor/controller 340, an input/output (I/O) interface 345, an input device(s) 350, a display 355, and a memory 360. The memory 360 includes an operating system (OS) 361 and one or more applications 362.

The RF transceiver 310 receives an incoming RF signal transmitted by a gNB of the wireless network 100 from the antenna 305. The RF transceiver 310 down-converts the incoming RF signal to generate an intermediate frequency (IF) or baseband signal. The IF or baseband signal is transmitted to the RX processing circuit 325, where the RX processing circuit 325 generates a processed baseband signal by filtering, decoding and/or digitizing the baseband or IF signal. The RX processing circuit 325 transmits the processed baseband signal to speaker 330 (such as for voice data) or to processor/controller 340 for further processing (such as for web browsing data).

The TX processing circuit 315 receives analog or digital voice data from microphone 320 or other outgoing baseband data (such as network data, email or interactive video game data) from processor/controller 340. The TX processing circuit 315 encodes, multiplexes, and/or digitizes the outgoing baseband data to generate a processed baseband or IF signal. The RF transceiver 310 receives the outgoing processed baseband or IF signal from the TX processing circuit 315 and up-converts the baseband or IF signal into an RF signal transmitted via the antenna 305.

The processor/controller 340 can include one or more processors or other processing devices and execute the OS 361 stored in the memory 360 in order to control the overall operation of UE 116. For example, the processor/controller 340 can control the reception of forward channel signals and the transmission of backward channel signals through the RF transceiver 310, the RX processing circuit 325 and the TX processing circuit 315. In some embodiments, the processor/controller 340 includes at least one microprocessor or microcontroller.

The processor/controller 340 is also capable of executing other processes and programs residing in the memory 360, such as operations for channel quality measurement and reporting for systems with 2D antenna arrays as described in embodiments of the disclosure. The processor/controller 340 can move data into or out of the memory 360 as required by an execution process. In some embodiments, the processor/controller 340 is configured to execute the one or more applications 362 based on the OS 361 or in response to signals received from the gNB or the operator. The processor/controller 340 is also coupled to an I/O interface 345, where the I/O interface 345 provides UE 116 with the ability to connect to other devices such as laptop computers and handheld computers. I/O interface 345 is a communication path between these accessories and the processor/controller 340.

The processor/controller 340 is also coupled to the input device(s) 350 and the display 355. An operator of UE 116 can input data into UE 116 using the input device(s) 350. The display 355 may be a liquid crystal display or other display capable of presenting text and/or at least limited graphics (such as from a website). The memory 360 is coupled to the processor/controller 340. A part of the memory 360 can include a random access memory (RAM), while another part of the memory 360 can include a flash memory or other read-only memory (ROM).

Although FIG. 3A illustrates an example of UE 116, various changes can be made to FIG. 3A. For example, various components in FIG. 3A can be combined, further subdivided or omitted, and additional components can be added according to specific requirements. As a specific example, the processor/controller 340 can be divided into a plurality of processors, such as one or more central processing units (CPUs) and one or more graphics processing units (GPUs). Furthermore, although FIG. 3A illustrates that the UE 116 is configured as a mobile phone or a smart phone, UEs can be configured to operate as other types of mobile or fixed devices.

Figure 3B:
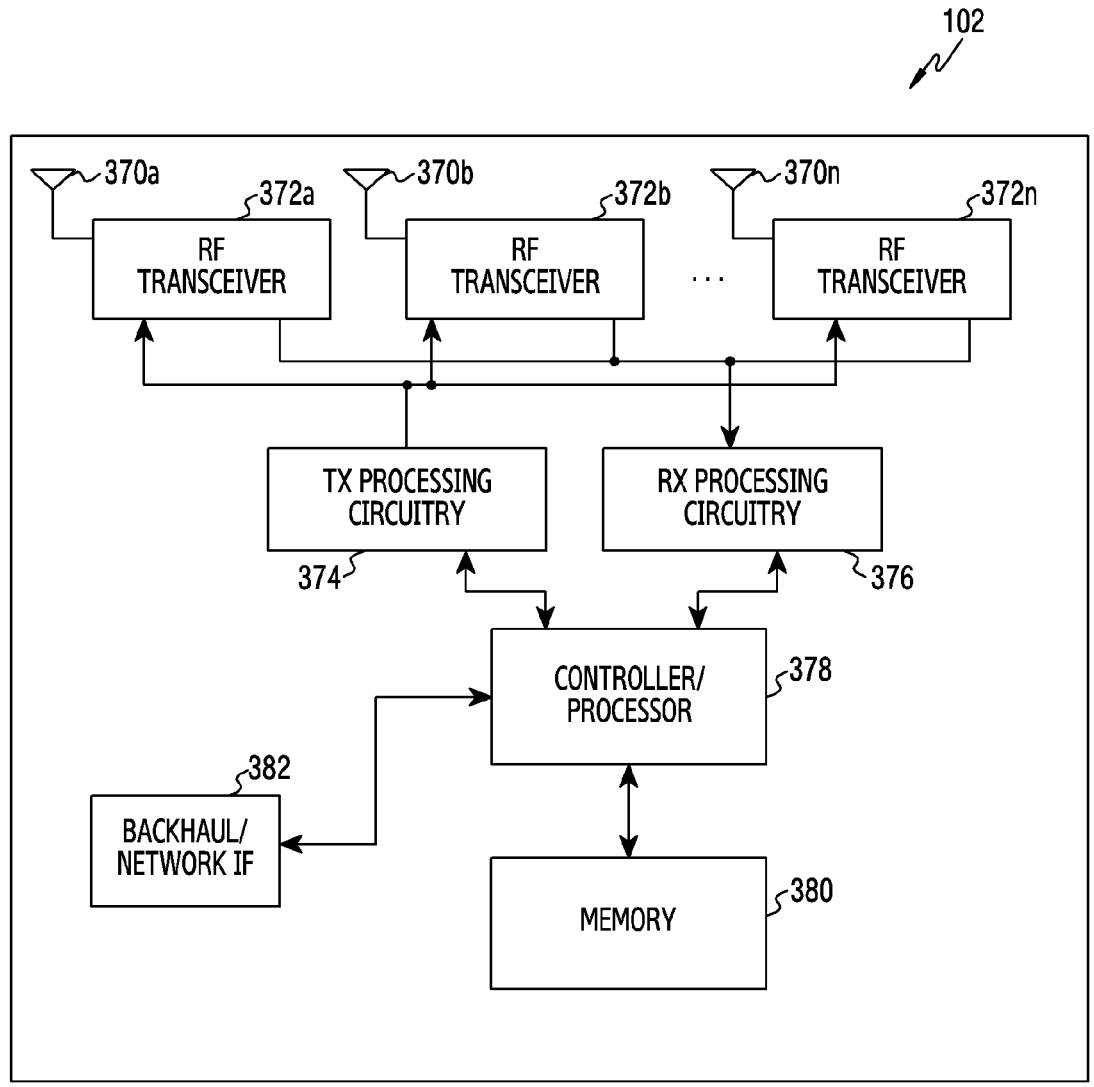
FIG. 3B illustrates an example gNB according to an embodiment of the disclosure.

FIG. 3B illustrates an example gNB according to some embodiments of the disclosure. The embodiment of gNB 102 shown in FIG. 3B is for illustration only, and other gNBs of FIG. 1 can have the same or similar configuration. However, a gNB has various configurations, and FIG. 3B does not limit the scope of the disclosure to any specific implementation of a gNB. It should be noted that gNB 101 and gNB 103 can include the same or similar structures as gNB 102.

Referring to FIG. 3B, gNB 102 includes a plurality of antennas 370a, 370b . . . 370n, a plurality of RF transceivers 372a, 372b . . . 372n, a transmission (TX) processing circuit 374, and a reception (RX) processing circuit 376. In certain embodiments, one or more of the plurality of antennas 370a-370n include a 2D antenna array. The gNB 102 also includes a controller/processor 378, a memory 380, and a backhaul or network interface 382.

RF transceivers 372a-372n receive an incoming RF signal from antennas 370a-370n, such as a signal transmitted by UEs or other gNBs. RF transceivers 372a-372n down-convert the incoming RF signal to generate an IF or baseband signal. The IF or baseband signal is transmitted to the RX processing circuit 376, where the RX processing circuit 376 generates a processed baseband signal by filtering, decoding and/or digitizing the baseband or IF signal. RX processing circuit 376 transmits the processed baseband signal to controller/processor 378 for further processing.

The TX processing circuit 374 receives analog or digital data (such as voice data, network data, email or interactive video game data) from the controller/processor 378. TX processing circuit 374 encodes, multiplexes and/or digitizes outgoing baseband data to generate a processed baseband or IF signal. RF transceivers 372a-372n receive the outgoing processed baseband or IF signal from TX processing circuit 374 and up-convert the baseband or IF signal into an RF signal transmitted via antennas 370a-370n.

The controller/processor 378 can include one or more processors or other processing devices that control the overall operation of gNB 102. For example, the controller/processor 378 can control the reception of forward channel signals and the transmission of backward channel signals through the RF transceivers 372a-372n, the RX processing circuit 376 and the TX processing circuit 374. The controller/processor 378 can also support additional functions, such as higher-level wireless communication functions. For example, the controller/processor 378 can perform a Blind Interference Sensing (BIS) process such as that performed through a BIS algorithm, and decode a received signal from which an interference signal is subtracted. The controller/processor 378 may support any of a variety of other functions in gNB 102. In some embodiments, the controller/processor 378 includes at least one microprocessor or microcontroller.

The controller/processor 378 is also capable of executing programs and other processes residing in the memory 380, such as a basic OS. The controller/processor 378 can also support channel quality measurement and reporting for systems with 2D antenna arrays as described in embodiments of the disclosure. In some embodiments, the controller/processor 378 supports communication between entities such as web RTCs. The controller/processor 378 can move data into or out of the memory 380 as required by an execution process.

The controller/processor 378 is also coupled to the backhaul or network interface 382. The backhaul or network interface 382 allows gNB 102 to communicate with other devices or systems through a backhaul connection or through a network. The backhaul or network interface 382 can support communication over any suitable wired or wireless connection(s). For example, when gNB 102 is implemented as a part of a cellular communication system, such as a cellular communication system supporting 5G or new radio access technology or NR, LTE or LTE-A, the backhaul or network interface 382 can allow gNB 102 to communicate with other gNBs through wired or wireless backhaul connections. When gNB 102 is implemented as an access point, the backhaul or network interface 382 can allow gNB 102 to communicate with a larger network, such as the Internet, through a wired or wireless local area network or through a wired or wireless connection. The backhaul or network interface 382 includes any suitable structure that supports communication through a wired or wireless connection, such as an Ethernet or an RF transceiver.

The memory 380 is coupled to the controller/processor 378. A part of the memory 380 can include an RAM, while another part of the memory 380 can include a flash memory or other ROMs. In certain embodiments, a plurality of instructions, such as the BIS algorithm, are stored in the memory. The plurality of instructions are configured to cause the controller/processor 378 to execute the BIS process and decode the received signal after subtracting at least one interference signal determined by the BIS algorithm.

As will be described in more detail below, the transmission and reception paths of gNB 102 (implemented using RF transceivers 372a-372n, TX processing circuit 374 and/or RX processing circuit 376) support aggregated communication with FDD cells and TDD cells.

Although FIG. 3B illustrates an example of gNB 102, various changes may be made to FIG. 3B. For example, gNB 102 can include any number of each component shown in FIG. 3A. As a specific example, the access point can include many backhaul or network interfaces 382, and the controller/processor 378 can support routing functions to route data between different network addresses. As another specific example, although shown as including a single instance of the TX processing circuit 374 and a single instance of the RX processing circuit 376, gNB 102 can include multiple instances of each (such as one for each RF transceiver).

Exemplary embodiments of the disclosure are further described below with reference to the accompanying drawings.

The text and drawings are provided as examples only to help readers to understand the disclosure. They are not intended and should not be interpreted as limiting the scope of the disclosure in any way. Although some embodiments and examples have been provided, based on the disclosure herein, it is apparent to those skilled in the art that changes can be made to the illustrated embodiments and examples without departing from the scope of the disclosure.

Wireless communication is one of the most successful innovations in modern history. Recently, the number of subscribers of wireless communication services has exceeded 5 billion, and it continues to grow rapidly. With the increasing popularity of smart phones and other mobile data devices (such as tablet computers, notebook computers, netbooks, e-book readers and machine-type devices) among consumers and enterprises, the demand for wireless data services is growing rapidly. In order to meet the rapid growth of mobile data services and support new applications and deployments, it is very important to improve the efficiency and coverage of wireless interfaces.

In an NR (New Radio access) network, a user has three states, that is, Connected state, Idle state and Inactive state. The user can only transmit data with the network in the connected state. If the user enters idle or inactive, it cannot transmit data with the network. When the user has no data transmission for a long time, the user can enter the idle state, so that a base station and the user will delete all contexts. If the user in the idle state has data to transmit, the user then starts a connection establishment process and establishes a context of the user with the base station. In this process, the user and the base station need necessary signaling interaction, and at the same time, the user and the base station also need signaling interaction with entities of a core network, and these interaction procedures all take some time. Therefore, the problem caused by the idle state of the user is that it takes a long time for the user to complete the connection establishment before data transmission, which will inevitably increase the communication delay. In order to overcome this problem, NR introduces inactive state. When the user is inactive, the base station, the user and the entities of the core network all preserve the context. When the user has data to transmit, it only need to initiate a procedure of connection Resume (this procedure mainly involves signaling interactions between the user and the base station, which saves most of procedures between the user and the base station and the core network), thus reducing the time delay for the user to start data transmission and saving the energy of the user. Therefore, in NR systems, the inactive state is a useful user state.

Figure 4:
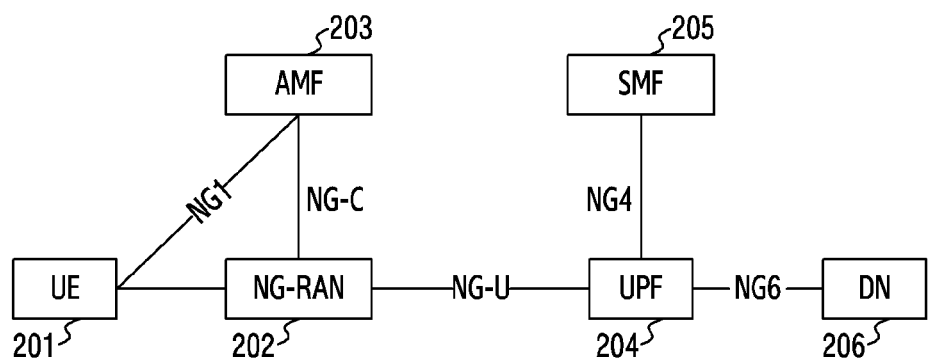
FIG. 4 illustrates an example of an exemplary system architecture according to an embodiment of the disclosure.
Figure 5:
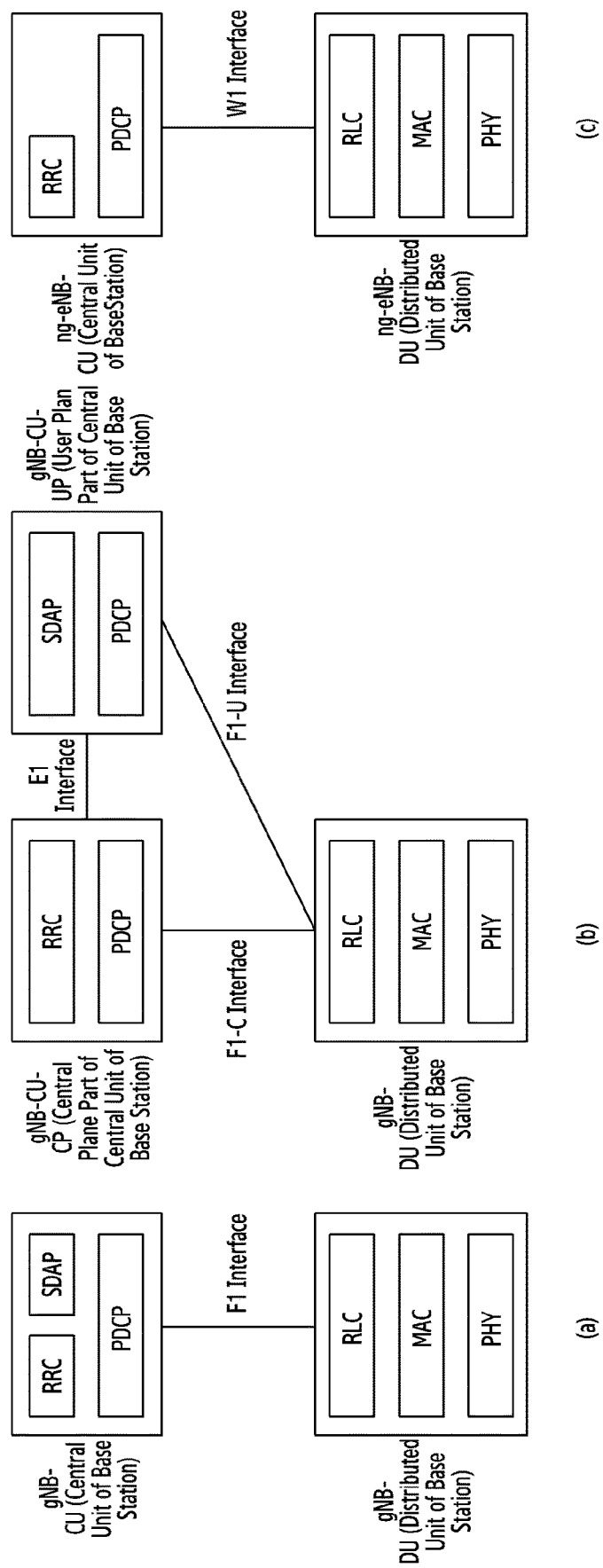
FIG. 5 illustrates an example of a structure of a base station according to an embodiment of the disclosure.

FIG. 4 is an exemplary system architecture according to an embodiment of the disclosure, and FIG. 5 is a structure of a base station according to an embodiment of the disclosure. Other embodiments of the system architecture can be used without departing from the scope of the disclosure. A user equipment (UE) 201 is a terminal device for receiving data. A next generation radio access network (NG-RAN) 202 is a radio access network, which includes a base station (gNB, or evolved node B (eNB) connected to a 5G core network (5GC), also called ng-gNB) that provide accesses to radio network interfaces for the UE. An access control and mobility management function entity (AMF) 203 is responsible for managing a mobility context and security information of the UE. A user plane function entity (UPF) 204 mainly provides functions of a user plane. A session management function entity (SMF) 207 is responsible for session management. A data network (DN) 206 includes services of operators, accesses to Internet and services of third parties, etc.

In NR systems, in order to support network function virtualization, more efficient resource management and scheduling, a base station (gNB/ng-eNB) that provides wireless network interfaces for a terminal (UE) may be further divided into a central unit gNB-CU/ng-eNB-CU (gNB central unit/ng-eNB central unit) and a distributed unit (gNB-DU/ng-eNB-DU) (abbreviated as CU and DU in the disclosure), as shown in part (a) of FIG. 5. The gNB-CU has a radio resource control (RRC) layer, a service data adaptation protocol (SDAP) layer and a packet data convergence protocol (PDCP) protocol layer, and ng-eNB-CU has an RRC layer and a PDCP layer. The gNB-DU/ng-eNB-DU has a radio link control protocol (RLC) layer, a medium access control (MAC) layer, a physical layer and/or the like. There is a standardized public interface F1 between the gNB-CU and the gNB-DU, and there is a standardized public interface W1 between the ng-eNB-CU and the ng-eNB-DU. The F1 interface is divided into a control plane F1-C and a user plane F1-U. A transport network layer of the F1-C is based on IP transmission. In order to transmit signaling more reliably, an SCTP protocol is added to IP. The application layer protocol is F1AP, see the standard. The SCTP can provide reliable transmission of application layer messages. A transport layer of the F1-U is UDP/IP, and a GTP-U is used to carry user plane protocol data units (PDUs) above UDP/IP. Furthermore, for the gNB-CU, as shown in part (b) of FIG. 5, the gNB-CU can include a gNB-CU-CP (a control plane part of the central unit of the base station) and a gNB-CU-UP (a user plane part of the central unit of the base station). The gNB-CU-CP includes functions of the control plane of the base station and has an RRC protocol layer and a SDAP protocol layer, while the gNB-CU-UP includes the control plane part of the base station. There is a standardized public interface E1 between gNB-CU-CP and gNB-CU-UP, and the protocol is E1AP, see the standard. An interface between the control plane part of the central unit of the base station and the distributed unit of the base station is an F1-C interface, that is, the control plane interface of F1, and An interface between the user plane part of the central unit of the base station and the distributed unit of the base station is an F1-U interface, that is, a user plane interface of F1. In addition, in NR systems, the base station that provides an E-UTRA user plane and control plane for accessing the 5G core network is called ng-eNB. In order to support virtualization, such base station (ng-eNB) may also be further divided into a central unit ng-eNB-CU (gNB central unit/ng-eNB central unit) and a distributed unit ng-eNB-DU (gNB distributed unit/ng-eNB distributed unit) (abbreviated as CU and DU in the disclosure), as shown in part (c) of FIG. 5. The ng-eNB-CU has an RRC layer and a PDCP layer. The gNB-DU/ng-eNB-DU has a radio link control protocol (RLC) layer, a medium access control (MAC) layer, a physical layer and/or the like. There is a standardized public interface W1 between the ng-eNB-CU and the ng-eNB-DU. The W1 interface is divided into a control plane W1-C and a user plane W1-U. A transport network layer of the W1-C is based on IP transmission. In order to transmit signaling more reliably, an SCTP protocol is added to IP. The application layer protocol is W1AP, see the standard. A transport layer of the W1-U is UDP/IP, and a GTP-U is used to carry user plane protocol data units (PDUs) above UDP/IP.

In actual networks, a user will transmit some (periodic or aperiodic) small data, such as traffic of some Instant Messaging Services (such as WeChat, QQ, Heart-beat packets, Keep-alive packets, push messages, etc.), traffic of wearable devices, traffic of sensors and traffic of smart meters, and the transmission of these data is not very frequent. In the related art, in order to transmit such small data, the user in the inactive state needs to first initiate an RRC Resume procedure, then transmit these small data, and finally return to the inactive state. In the whole process, the transmitted signaling may be far more than the transmitted data. This introduces unnecessary energy consumption and signaling overhead. In order to overcome this problem, the method of small data transmission is defined, which allows the user to transmit small data in the inactive state and avoids some unnecessary signaling overhead.

Before introducing the specific content, some assumptions and definitions of the disclosure are given below.

The message names in the disclosure are only examples, and other message names may also be used.

The "first", "second" and/or the like included in the message names of the disclosure are only examples of messages, and do not represent the order of execution.

In the disclosure, detailed description of steps irrelevant to the disclosure is omitted.

In the disclosure, the steps in each procedure may be performed in combination with each other or independently performed. The execution steps of each procedure are only examples, and other possible execution orders are not excluded.

In the disclosure, the base station may be a 5G base station (such as gNB, ng-eNB), a fourth generation (4G) base station (such as eNB), or other types of access nodes.

In the disclosure, transmission of data refers to receiving or transmitting of the data.

The various nodes in the disclosure may include at least one of:

First node: it is a base station, or a central unit of the base station, or a control plane part of the central unit of the base station, or a user plane part of the central unit of the base station, such as a gNB, gNB-CU, gNB-CU-CP, gNB-CU-UP, ng-eNB, ng-eNB-CU, ng-eNB-CU-CP, or ng-eNB-CU. In an embodiment, the node is a node that a user connects to before the user enters the inactive state, such as an anchor node.

Second node: it is a node different from the first node, which may be a base station, or a central unit of the base station, or a control plane part of the central unit of the base station, such as a gNB, gNB-CU, gNB-CU-CP, gNB-CU-UP, ng-eNB, ng-eNB-CU, ng-eNB-CU-CP, or ng-eNB-CP. In an embodiment, the node is a node to which a user initiates a resume process, or a node with which the user performs small data transmission, such as a serving node.

Third node: the node may be the above-mentioned first node, the above-mentioned second node, or represent the first node and the second node. In addition, the first node and the second node may also be the same node, and thus the third node is the first node/second node.

Fourth node: it is a distributed unit of a base station, gNB-DU, or ng-eNB-DU. In an embodiment, when the third node is a central unit of the base station or a control plane part of the central unit of the base station or a user plane part of the central unit of the base station, the fourth node is the distributed unit connected to the third node.

Fifth node: the node may be at least one of the above-mentioned first node, second node, third node and fourth node.

Sixth node: a user terminal, such as a UE (user equipment).

In the disclosure, small data is a type of data transmitted by a user, which may belong to a specific radio bearer (such as a Data Radio Bearer (DRB), a specific session (such as a Protocol Data Unit (PDU) Session), or a specific data flow (such as a Quality of Service (QoS) flow). In an embodiment, the small data is data transmitted by the user when the user is in the inactive state. In the disclosure, non-small data is another type of data transmitted by the user, that is, data different from small data, which may belong to a specific radio bearer (such as a Data Radio Bearer (DRB)) or a specific session (such as a Protocol Data Unit (PDU) Session), or a specific data flow (such as a Quality of Service (QoS) Flow). In an embodiment, the non-small data is data that a user can only transmit when the user is in the Connected state.

The disclosure is related to the following procedures, including: 1) a procedure between base stations, 2) a procedure between a central unit (or a control plane part of the central unit or a user plane part of the central unit) of a base station and a distributed unit of the base station, and 3) a procedure between the base station and a user equipment. These procedures will involve at least one of the following identification information related to a user:

First identification information of the user, such as UE XnAP UE ID, which is a user identification information at a receiving node. In an embodiment, the identification information may be a new NG-RAN node UE XnAP ID reference included in a RETRIEVE UE CONTEXT REQUEST message.

Identification information of inactivity, which is used to identify the user in the inactive state. Further, the identification information may contain two parts, one part is identification information of a node allocating the "identification information of inactivity", and the other part is used to find a context of the user at the node allocating the "identification information of inactivity". In an embodiment, the identification information is an Inactive-Radio Network Temporary Identifier (I-RNTI); In another embodiment, the identification information may be a full Inactive-Radio Network Temporary Identifier (full I-RNTI); In still another embodiment, the identification information may be a short Inactive-Radio Network Temporary Identifier (short I-RNTI).

User context identification information (UE CONTEXT ID), which is used to obtain the context of the user and includes at least one of the following information:

Identification information of inactivity. In an embodiment, the identification information is an Inactive-Radio Network Temporary Identifier (I-RNTI); in another embodiment, the identification information may be a full Inactive-Radio Network Temporary Identifier (full I-RNTI); in still another embodiment, the identification information may be a short Inactive-Radio Network Temporary Identifier (short I-RNTI).

User identification information of a cell. In an embodiment, the identification information is a Cell-Radio Network Temporary Identifier (C-RNTI), and in another embodiment, the identification information is a Temporary Cell-Radio Network Temporary Identifier (Temporary C-RNTI). Furthermore, the identification information may be allocated by the cell where the user requests to resume connection, or the C-RNTI included in a connection reestablishment request message (RRCReestablishmentRequest).

Identification information of an accessed cell. In an embodiment, the identification information may be a Physical cell identity (PCI) of the cell. Further, the cell may be a cell where the user requests to resume connection.

Identification information of a cell where a failure occurs, which indicates the cell where the user fails to connect.

Integrity protection information, such as integrity protection information, which is an authentication token required for user authentication at the base station. In an embodiment, the information is ResumeMAC-I or shortResumeMAC-I included in a connection resume request (RRCResumeRequest) message; in another embodiment, the information is ShortMAC-I included in a connection reestablishment request (RRCReestablishmentRequest) message.

Identification information of a new cell, where the cell is a cell where the user performs connection resume. In an embodiment, the identification information may be a target cell ID.

Figure 6:
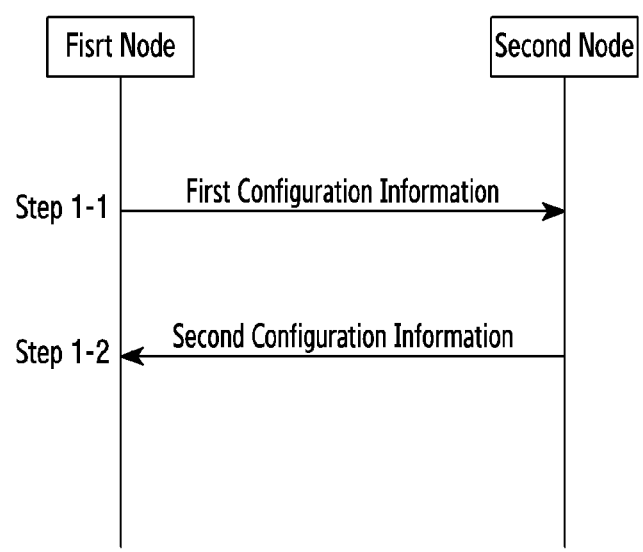
FIG. 6 illustrates a procedure between a first node and a second node according to an embodiment of the disclosure.

FIG. 6 illustrates a procedure between a first node and a second node according to an embodiment of the disclosure.

Referring to FIG. 6, this procedure occurs between the first node and the second node. In an embodiment, the first node is a node to which a user is connected before entering the inactive state, that is, an anchor node, and the second node is a node where the user initiates a Connection Resume process, that is, a serving node. Further, the first node and/or the second node may be a base station, or a central unit of the base station, or a control plane part of the central unit of the base station, or a user plane part of the central unit of the base station.

In order to realize small data transmission, a possible method is that a context of the user is maintained in the first node, but the user performs the small data transmission through a cell belonging to the second node, in other words, the user performs the small data transmission with the first node through the cell belonging to the second node. This method is SDT (Small Data Transmission) without context relocation. In this process, signaling interaction is needed between the first node and the second node to complete configuring the small data transmission of the user. This procedure is to realize the configuration of the small data transmission, and specifically includes at least one of the following steps:

Step 1-1: the first node transmits a first message to the second node, which is used to provide configuration information for the user to the second node, or the first node requests the configuration information for the user from the second node. The message includes at least one of the following information:

Identification information related to the user, which may include at least one of the following information:

Identification information of the user for small data transmission, which indicates the user performing the small data transmission. In an embodiment, this information is UE XnAP/X2AP ID. Furthermore, this information may be named SDT UE ID, or SDT UE XnAP/X2AP ID, or other names.

First identification information of the user, the content of which may be referred to the description of the above "identification information related to the user". In an embodiment, the information may be a new NG-RAN node UE XnAP ID reference included in a RETRIEVE UE CONTEXT REQUEST message transmitted by the second node to the first node, where the RETRIEVE UE CONTEXT REQUEST message is transmitted by the second node to the first node before step 1-1, that is, the first node transmits the new NG-RAN node UE XnAP ID reference transmitted by the second node back to the second node. Furthermore, this information may be named SDT UE XnAP/X2AP ID reference or other names.

Identification information of inactivity, the content of which may be referred to the description of the above "identification information related to the user". In an embodiment, the information may be a I-RNTI included in a RETRIEVE UE CONTEXT REQUEST message transmitted by the second node to the first node, where the RETRIEVE UE CONTEXT REQUEST message is transmitted by the second node to the first node before step 1-1, that is, the first node transmits the I-RNTI transmitted by the second node back to the second node. Furthermore, this information may be named SDT I-RNTI or other names.

User context identification information, the content of which may be referred to the description of the above "identification information related to the user". In an embodiment, the information may be a UE Context ID included in a RETRIEVE UE CONTEXT REQUEST message transmitted by the second node to the first node, where the RETRIEVE UE CONTEXT REQUEST message is transmitted by the second node to the first node before step 1-1, that is, the first node transmits the UE Context ID transmitted by the second node back to the second node. Further, this information may be named SDT Context ID or other names.

Integrity protection information, the content of which may be referred to the description of the above "identification information related to the user". In an embodiment, the information may be an Integrity Protection included in a RETRIEVE UE CONTEXT REQUEST message transmitted by the second node to the first node, where the RETRIEVE UE CONTEXT REQUEST message is transmitted by the second node to the first node before step 1-1, that is, the first node transmits the Integrity Protection transmitted by the second node back to the second node. Furthermore, this information may be named SDT integrity protection or other names.

Identification information of a new cell, the content of which may be referred to the description of the above "identification information related to the user". In an embodiment, the information may be a New Cell Identifier included in the RETRIEVE UE CONTEXT REQUEST message transmitted by the second node to the first node, where the RETRIEVE UE CONTEXT REQUEST message is transmitted by the second node to the first node before step 1-1, that is, the first node transmits the New Cell Identifier transmitted by the second node back to the second node.

The above information is transmitted by the second node to the first node before step 1-1, and the second node receives at least one of the above information, which may have the following effects: 1) it may assist the second node to determine the served user, so as to determine whether the user is a user performing the small data transmission; 2) it may determine messages to be transmitted to the user, such as an RRC Release message and an RRC Resume message; and 3) it may assist the second node to determine a user context that needs to be released. The technical effect of the second node receiving at least one of the above information is to assist the second node to identify the user, assist the second node to determine messages transmitted to the user, and accelerate the user to connect to a network for data communication. In an embodiment, the above-mentioned "first message" may be a message over a new XnAP/X2AP interface; in another embodiment, the above-mentioned "first message" may be a RAN PAGING message over the XnAP/X2AP interface, but the above-mentioned "identification information related to the user" is different from information included in a paging message over an existing XnAP/X2AP interface: in the paging message over the existing XnAP/X2AP interface, identification information of a paged user (such as a UE RAN paging identity) (namely Full I-RNTI) has been included, but this information may not assist the second node to determine the paged user or whether the paged user is performing the small data transmission. This is because the user does not provide the Full I-RNTI to the second node when the user performs connection resume in a cell belonging to the second node (that is, the RRCResumeRequest message does not contain the Full I-RNTI). Therefore, by the above additional information, it may assist the second node to determine the paged user served by it when receiving the paging message, and then determine whether the user is performing the small data transmission. In another embodiment, the above-mentioned "first message" may be a Handover Request message over the XnAP/X2AP interface, and the existing handover request message already includes user identification information allocated by the first node, such as a source NG-RAN node UE XNAP ID reference. However, this information cannot assist the second node to identify a user related to the handover process. In order to overcome this technical problem, the above-mentioned "identification information related to the user" provides some identification information about the user at the second node, and thus the adding of the above-mentioned "identification information related to the user" to the handover request message may assist the second node to identify a user who is performing handover and determine whether the user is performing the small data transmission.

First indication information related to the user, which is used to indicate a behavior of the user. After receiving the indication information, the second node will transmit the indication information to the user or determine its signaling interaction with the user according to the indication information. The information includes at least one of the following information:

First indication information of arrival of non-small data, which is used to indicate the arrival of the non-small data at the first node or the arrival of the non-small data at the second node. Further, this information may also be used to indicate that the arrived non-small data is an uplink packet and/or a downlink packet.

First indication information of non-small data transmission, which is used to indicate that the user is required to perform the non-small data transmission.

First indication information of starting of a connection resume procedure, which is used to indicate the user to perform the connection resume procedure.

First indication information of entering of a connected state, which is used to indicate that the user may enter the connected state.

First indication information of paging of the user, which is used to indicate the second node to page the user.

The technical effect of the above-mentioned "first indication information related to the user" is to determine the arrival of user data and assist the second node to determine the configuration information transmitted to the user.

First information related to security, which is used to assist the user to update configurations related to security or generate new keys. In an embodiment, this information may be a next hop chaining count (NextHopChainingCount). Further, the second node will transmit the information to the user after receiving the information. The technical effect of this information is that it may provide the user with the configuration information related to security, so that the user may access a network or communicate data with the network according to this configuration information. This configuration information may update security configuration information used by the user in small data transmission, or may assist the user to obtain configuration information used after small data transmission, or assist the user to obtain configuration information used when a new connection is established.

First container related to user messages, user messages included in this container will be transmitted to the user. In an embodiment, the container includes the user messages (such as an RRC message). In another embodiment, the container includes a PDCP PDU of the user messages (such as an RRC message). The user messages included in the container may be at least one of the following messages: 1) a connection release message (such as an RRC Release message); 2) a connection resume message (such as an RRCResume message); 3) a reconfiguration message (such as an RRCReconfiguration message, which may also be a handover command message that indicates the user to perform handover, such as an RRCReconfiguration message containing synchronization information); and 4) a new RRC message. The technical effect of the above-mentioned "first container related to user messages" is to assist the second node to obtain the latest user messages that are generated by the first node, so as to assist the second node to configure the user or update the configuration for the user. In an embodiment, the user is performing the small data transmission. The above user messages may also include the following information:

Second indication information related to the user, which is used to indicate a behavior of the user. The indication information will be transmitted to the user along with the user messages, and the user will perform subsequent operations according to the information, such as initiating a new resume process and transmitting a connection resume request message, etc. The information includes at least one of the following information:

Second indication information of arrival of non-small data, which is used to indicate the arrival of the non-small data of the user. Further, this information may also be used to indicate that the arrived non-small data is an uplink packet and/or a downlink packet.

Second indication information of non-small data transmission, which is used to indicate that the user is required to perform the non-small data transmission.

Second indication information of starting of a connection resume procedure, which is used to indicate the user to perform the connection resume procedure.

Second indication information of entering of a connected state, which is used to indicate that the user may enter the connected state.

Second indication information of paging of the user, which is used to indicate that the user is paged.

Second information related to security, which is used to assist the user to update configurations related to security or generate new keys. In an embodiment, this information may be a next hop chaining count (NextHopChainingCount).

First information related to configured grant, which is used to configure the user to perform small data transmission. The information configures resources used for transmitting small data (e.g., uplink resources, such as a physical uplink shared channel (PUSCH)), and includes at least one of the following information:

Identification information of a configuration, configID;

Start time parameter information for configured grant, which indicates position information for configured grant, and includes at least one of period and offset information, start System Frame Number (SFN) information, and start subframe information;

Number information of occasions for configured grant, which indicates a number of the occasions for configured grant;

Setting information of a time alignment timer for configured grant;

RNTI (Radio Network Temporary Identifier) information for configured grant;

Frequency modulation configuration information of a physical downlink shared channel (PDSCH) for configured grant;

Configuration information of a physical uplink control channel (PUCCH) for configured grant;

Configuration information of a PUSCH for configured grant;

Implicit release configuration information for configured grant (implicitReleaseAfter). In an embodiment, this information indicates a number of occasions for configured grant that may be skipped in the case of implicit release configured grant; and UL Grant Information for configured grant.

The information included in the above-mentioned "first information related to configured grant" may be referred to PUR-Config in the standard, and may also be referred to information elements (such as ConfigGrant-Config, CGrant-Config, etc.) of configuration information for configured grant defined in the standard. The above-mentioned "first information related to configured grant" is transmitted through the above-mentioned "container related to user messages", such as the connection release message. In another embodiment, the above-mentioned "first information related to configured grant" is transmitted through a separate RRC container. In another embodiment, the above-mentioned "first information related to configured grant" may be transmitted to the second node through one or more information elements.

When the above user message is the connection resume message, an RRCResume message in the related art does not contain the above information related to security. When the user receives the second information related to security, the user is required to update keys and then transmit data. When the above user message is the connection resume message and/or the reconfiguration message, the first node will add a PDCP header to the message and then transmit a PDCP PDU containing the user message to the second node. When the user message is the connection release message, if there is another connection release message not transmitted to the user at the second node, the second node is required to update the connection release message not transmitted to the user with a newly received message.

Information related to user context, which is used to transmit context information of the user to the second node. The content of this information may be referred to the RETRIEVE UE CONTEXT RESPONSE message. In an embodiment, the above-mentioned first message may be transmitted by the first node proactively, instead of being transmitted based on a request of the second node. A possible situation that triggers the first node to proactively transmit the user context information to the second node is that the first node receives a packet of non-small data of the user, and another possible situation is that the first node knows the packet of non-small data of the user, and other possible situations are not excluded. Thus, this embodiment is a scheme that differs from the related art. One of the technical effects of the above-mentioned "information related to user context" is to assist the second node to obtain the context of the user performing the small data transmission.

First indication information of configured grant request, which is used to request the second node to provide information for configured grant (contents included in this information for configured grant may be referred to the description in the above-mentioned "first information related to configured grant"). After receiving this information, the second node will provide the first node with the information for configured grant. The above-mentioned "first indication information of configured grant request" may assist the first node to obtain the configuration information for configured grant for the user, and transmit the configuration information to the user (for example, transmit it to the user through the second node), so that the user may use it in the next small data transmission.

First indication information of release of the user, which is used to indicate the second node to release the user. One way to release the user is to transmit a connection release message to the user. The technical effect of the indication information is to assist the second node to release the user and reduce resource waste.

First indication information of termination of small data transmission, which is used to indicate that the user may terminate the small data transmission. The technical effect of the indication information is to assist the second node to release user resources and reduce resource waste.

First indication information of no small data, which is used to indicate that the user has no small data for transmission. The technical effect of the indication information is that it may assist the second node to obtain the state of small data transmission of the user and assist the second node to release resources used for user data transmission in time.

First time information, which is used to indicate the elapsed time before the second node releases the user. The technical effect of the indication information is that it may assist the second node to determine the time to release the user, thereby saving resources of the second node.

Step 1-2: the second node transmits a second message to the first node, which is used to provide the configuration information for the user to the first node, or the second node requests the configuration information for the user from the first node. The message includes at least one of the following information:

Public Land Mobile Network (PLMN) identification information, which indicates a PLMN of a cell of the second node to which the user accesses, and the accessed cell may be a cell where the user performs the small data transmission. In an embodiment, this information may assist the first node to obtain identification information of the cell where the user accesses the second node (for example, a cell where the user performs the connection resume, and a cell where the user performs the small data transmission) (the identification information includes a PLMN ID and a cell ID in the PLMN indicated by the PLMN ID), and further, it may assist the first node to perform related procedures related to the user (such as a user handover procedure). In an embodiment, if the second message is a RETRIEVE UE CONTEXT REQUEST message, then the PLMN corresponding to this information is a PLMN where a cell indicated by a New Cell Identifier in the second message (for example, the cell where the user performs the connection resume, and the cell where the user performs the small data transmission) is located. The technical effect of this information is that when the user is configured, it assists the first node to obtain the PLMN to which the user accesses, so that the first node may perform a configuration for the user (e.g., a configuration of a target cell required for user handover).

Second indication information of a user state, which is used to notify the state of the user, for example, the user's small data transmission process has been terminated, or the second node releases the user, or the second node transmits a connection release message to the user, or the user enters the inactive state, or the user enters the inactive state without small data transmission. The technical effect of this information is to assist the second node to obtain the state of the user for the small data transmission, so as to determine whether to update configurations of the user to save resources of the first node.

First user message, which is a message of the user generated by the second node or a message transmitted by the user to the second node, such as a connection resume message (RRCResume) or a new RRC message. In an embodiment, after receiving the message, the first node will add a PDCP header to the message, which will then be transmitted by the first node to the second node and finally transmitted by the second node to the user. Further, the "first user message" may also contain configuration information related to user security, such as NextHopChainingCount (next hop chaining count). In another embodiment, the second node receives a message from the user including third indication information related to the user, which is used to indicate a behavior of the user, and includes at least one of the following information:

Third indication information of arrival of non-small data, which is used to indicate the arrival of the non-small data of the user. Further, this information may also be used to indicate that the arrived non-small data is an uplink packet and/or a downlink packet.

Third indication information of non-small data transmission, which is used to indicate that the user is required to perform the non-small data transmission.

Third indication information of starting of a connection resume procedure, which is used to indicate the user to perform the connection resume procedure.

Third indication information of entering of a connected state, which is used to indicate that the user may enter the connected state.

The technical effect of this "first user message" is that the message that is required to be transmitted to the user is transmitted to the first node, and the first node processes the message to transmit the first message to the user.

Fourth indication information related to the user, which is used to indicate a behaviour of the user. The information includes at least one of the following information:

Fourth indication information of arrival of non-small data, which is used to indicate the arrival of the non-small data of the user. Further, this information may also be used to indicate that the arrived non-small data is an uplink packet and/or a downlink packet.

Fourth indication information of non-small data transmission, which is used to indicate that the user is required to perform the non-small data transmission.

Fourth indication information of starting of a connection resume procedure, which is used to indicate the user to perform the connection resume procedure.

Fourth indication information of entering of a connected state, which is used to indicate that the user may enter the connected state.

The technical effect of the above-mentioned "fourth indication information related to the user" is to determine the arrival of user data and assist the first node to determine the configuration information transmitted to the user.

Second information related to configured grant, which is used for the second node to generate a configuration related to the user for performing the small data transmission. The information configures resources used for transmitting small data (e.g., uplink resources, such as a PUSCH), and includes at least one of the following information:

Identification information of a configuration, configID;

Start time parameter information for configured grant, which indicates position information for configured grant, and includes at least one of period and offset information, start System Frame Number (SFN) information, and start subframe information;

Number information of occasions for configured grant, which indicates a number of the occasions for configured grant;

Setting information of a time alignment timer for configured grant;

RNTI (Radio Network Temporary Identifier) information for configured grant;

Frequency modulation configuration information of a PDSCH for configured grant;

Configuration information of a PUCCH for configured grant;

Configuration information of a PUSCH for configured grant;

Implicit release configuration information for configured grant (implicitReleaseAfter). In an embodiment, this information indicates a number of occasions for configured grant that may be skipped in the case of implicit release configured grant; and UL Grant Information for configured grant.

The information included in the above "second information related to configured grant" may be referred to PURConfig in the standard, and may also be referred to information elements (such as ConfigGrant-Config, CGrant-Config, etc.) of configuration information for configured grant defined in the standard. In an embodiment, the above "second information related to configured grant" is transmitted through RRC messages, such as the connection release message. In another embodiment, the above "second information related to configured grant" is transmitted through a separate RRC container. In another embodiment, the second information related to configured grant may be transmitted to the first node through one or more information elements.

The technical effect of the above-mentioned "second information related to configured grant" is to assist the first node to obtain the configuration information for configured grant for the small data transmission, so that the first node may generate configuration messages for configuring the user, thereby assisting the user to perform the small data transmission.

Second indication information of termination of small data transmission, which is used to indicate that the user may terminate the small data transmission. The technical effect of this information is to assist the first node to determine the state of small data transmission of the user, so as to release resources for the user.

Second indication information of no small data, which is used to indicate that the user has no small data for transmission. The technical effect of this information is to assist the first node to determine the state of small data transmission of the user, so as to release resources for the user.

First lower layer configuration information, which is used to provide configuration information related to data. In an embodiment, the configuration information is about all data (all radio bearers, or all PDU sessions, or all QoS flows). In another embodiment, the configuration information is configuration information about small data (a bearer of small data, or a PDU session of small data, or a QoS flow of small data). In another embodiment, the configuration information is configuration information about small data based on random access (a bearer of small data, or a PDU session of small data, or a QoS flow of small data). In another embodiment, the configuration information is configuration information about small data based on configured grant (a bearer of small data, or a PDU session of small data, or a QoS flow of small data). The configuration information includes at least one of the following information:

Configuration information included in CellGroupConfig; and

RLC bearer configuration information (such as RLCBearerConfig), which includes at least one of the following information:

Configuration information of RLC;
Configuration information of logical information;
Identification information of logical channels;
Identification information of bearers;
Configuration information of RLC; and
Configuration information of logical channels.

The contents included in the above information may be referred to definitions in the standard. In an embodiment, the information included in the above "first lower layer configuration information" may be transmitted to the first node in an RRC container, and in another embodiment, the information included in the above "first lower layer configuration information" may be transmitted to the first node in one or more information elements. The technical effect of the "first lower layer configuration information" is to assist the first node to obtain the latest configuration information for the user, so that the first node may use the latest configuration to perform data transmission with the user when serving the user.

FIG. 6 illustrates one of the execution methods of step 1-1 and step 1-2, which may be at least one of the following methods:

Step 1-1 is performed before step 1-2, then the second message is a response message for the first message.

Step 1-2 is performed before step 1-1, then the first message is a response message for the second message.

Step 1-1 is performed separately.

Step 1-2 is performed separately.

The first message in the above procedure may be an RAN PAGING message, an RRC TRANSFER message, or a RETRIEVE UE CONTEXT RESPONSE message, or a RETRIEVE UE CONTEXT FAILURE message, or a HANDOVER REQUEST message, or may also be a newly defined message, such as a UE CONTEXT FORWARDING message.

The second message in the above procedure may be an Xn-U/X2-U address indication message, an RRC TRANSFER message, a RETRIEVE UE CONTEXT REQUEST message, a HANDOVER REQUEST ACKNOWLEDGE message, or may also be a newly defined message, such as a UE CONTEXT FORWARDING ACKNOWLEDGE message.

The advantages of the above procedure at least include: 1) assisting the second node to determine the user corresponding to the received message, and then determining whether the user is performing the small data transmission; 2) transferring the RRC message for the user or updating the RRC message for the user, so as to configure the user, 3) assisting the second node to determine the user context that needs to be released, and 4) obtaining the latest configuration for the user.

Figure 7:
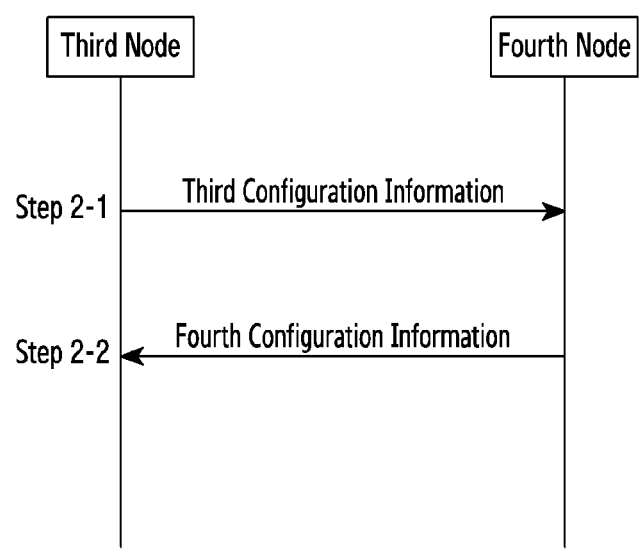
FIG. 7 illustrates a procedure between a third node and a fourth node according to an embodiment of the disclosure.

FIG. 7 illustrates a procedure between a third node and a fourth node according to an embodiment of the disclosure.

Referring to FIG. 7, this procedure occurs between the third node and the fourth node. The third node is a central unit of a base station, or a control plane part of the central unit of the base station, or a user plane part of the central unit of the base station. The fourth node is a distributed unit of the base station. In an embodiment, the third node and/or the fourth node belong to the base station to which the user is connected before a user enters the inactive state, that is, an anchor node, and the third node and/or the fourth node belong to the base station where the user initiates a connection resume process, that is, a serving node. The process includes at least one of the following steps:

Step 2-1: the third node transmits a third message to the fourth node, which is used to provide the fourth node with configuration information related to the user. Further, the information may be configuration information related to small data transmission of the user. In an embodiment, the message is for a user (that is, a configuration message related to the user), and further, the user may be a user who performs the small data transmission. The message includes at least one of the following information:

Identification information of the user, which may be used to indicate a user targeted by the third message, such as a gNB-CU UE F1AP ID and a gNB-DU UE F1AP ID. In an embodiment, the information may contain one identifier, and in another embodiment, the information may contain two or more identifiers.

Identification information of the user for small data transmission, which indicates identification information of the user performing the small data transmission, such as an SDT UE ID, a gNB-CU SDT UE F1AP ID, a gNB-DU SDT UE F1AP ID, etc. The identification information may contain one or more identifier. The user indicated by the identification information may be the same as the user indicated by the above-mentioned "identification information of the user", and further, one of the functions of this information is to assist the fourth node to determine a context of the user performing the small data transmission. A scenario involving this information is that before the fourth node receives the third message, the fourth node already has the context of the user targeted by the third message, so the "identification information of the user for small data transmission" may assist the fourth node to obtain the context of the user without re-establishing the context of the user.

Fifth indication information related to the user, which is used to indicate a behavior of the user. After receiving the indication information, the fourth node will transmit the indication information to the user or determine its signaling interaction with the user according to the indication information. The information includes at least one of the following information:

Fifth indication information of arrival of non-small data, which is used to indicate the arrival of the non-small data. Further, this information may also be used to indicate that the arrived non-small data is an uplink packet and/or a downlink packet.

Fifth indication information of non-small data transmission, which is used to indicate that the user is required to perform the non-small data transmission.

Fifth indication information of starting of a connection resume procedure, which is used to indicate the user to perform the connection resume procedure.

Fifth indication information of entering of a connected state, which is used to indicate that the user may enter the connected state.

Fifth indication information of paging of the user, which is used to indicate that the user is paged.

The technical effect of the above-mentioned "fifth indication information related to the user" is to determine the arrival of user data and assist the fourth node to determine the configuration information transmitted to the user.

Second container related to user messages, the user messages included in this container will be transmitted to the user. The container includes a PDCP PDU of the user messages (such as an RRC message). The user messages included in the container may be at least one of the following messages: 1) a connection release message (such as an RRC Release message); 2) a connection resume message (such as an RRCResume message); 3) a reconfiguration message (such as an RRCReconfiguration message, which may also be a handover command message that indicates the user to perform handover, such as an RRCReconfiguration message containing synchronization information); 4) other existing RRC messages; and 5) a new RRC message. The above user messages may also include the following information:

Sixth indication information related to the user, which is used to indicate a behavior of the user. The indication information will be transmitted to the user along with the user messages, and the user will perform subsequent operations according to the information, such as initiating a new resume process and transmitting a connection resume request message, etc. The information includes at least one of the following information:

Sixth indication information of arrival of non-small data, which is used to indicate the arrival of the non-small data of the user. Further, this information may also be used to indicate that the arrived non-small data is an uplink packet and/or a downlink packet.

Sixth indication information of non-small data transmission, which is used to indicate that the user is required to perform the non-small data transmission.

Sixth indication information of starting of a connection resume procedure, which is used to indicate the user to perform the connection resume procedure.

Sixth indication information of entering of a connected state, which is used to indicate that the user may enter the connected state.

Third information related to security, which is used to assist the user to update configurations related to security or generate new keys. In an embodiment, this information may be a next hop chaining count (NextHopChainingCount).

Third information related to Configured grant, which is used to configure the user to perform small data transmission. The information configures resources used for transmitting small data (e.g., uplink resources, such as a PUSCH), and includes at least one of the following information:

Identification information of a configuration, configID;

Start time parameter information for configured grant, which indicates position information for configured grant, and includes at least one of period and offset information, start System Frame Number (SFN) information, and start subframe information;

Number information of occasions for configured grant, which indicates a number of the occasions for configured grant;

Setting information of a time alignment timer for configured grant;

RNTI (Radio Network Temporary Identifier) information for configured grant;

Frequency modulation configuration information of a PDSCH for configured grant;

Configuration information of a PUCCH for configured grant;

Configuration information of a PUSCH for configured grant;

Implicit release configuration information for configured grant (implicitReleaseAfter). In an embodiment, this information indicates a number of occasions for configured grant that may be skipped in the case of implicit release configured grant; and UL Grant Information for configured grant.

The information included in the above "third information related to configured grant" may be referred to PUR-Config in the standard, and may also be referred to information elements (such as ConfigGrant-Config, CGrant-Config, etc.) of configuration information for configured grant defined in the standard. The technical effect of the above-mentioned "second container related to user messages" is to transmit the latest configuration messages to the user.

Second indication information of configured grant request, which is used to request the fourth node to provide information for configured grant (contents included in this information for configured grant may be referred to the description in the above-mentioned "second information related to configured grant"). After receiving this information, the fourth node will provide the third node with the information for configured grant. The above-mentioned "second indication information of configured grant request" may assist the fourth node to generate the configuration information for configured grant for the user, so as to configure the user, so that the user may use it in the next small data transmission.

First indication information of lower layer configuration request, which is used to request the fourth node to provide lower layer configuration information. In an embodiment, the lower layer configuration information is a configuration related to small data transmission of the user. After receiving this information, the fourth node will provide the lower layer configuration information to the third node. The "first indication information of lower layer configuration request" is to request the fourth node to provide the latest configuration used by the user for small data transmission, so that the user may use it for the small data transmission in the future.

Second time information, which is used to indicate elapsed time before the fourth node transmits a message to the user. In an embodiment, the message transmitted by the fourth node to the user is the connection release message, that is, after the fourth node receives the connection release message (such as an RRC Release message), the fourth node is required to wait for the time indicated by the above "second time information" before transmitting the connection release message to the user. The technical effect of the indication information is that it may assist the fourth node to determine the time to transmit the configuration message to the user, thereby saving the resources of the fourth node and avoiding the interruption of user data transmission.

Third indication information of termination of small data transmission, which is used to indicate that the user may terminate the small data transmission. The technical effect of the indication information is to assist the fourth node to release user resources and reduce resource waste.

Third indication information of no small data, which is used to indicate that the user has no small data for transmission. The technical effect of the indication information is that it may assist the fourth node to obtain the state of small data transmission of the user and assist the fourth node to release resources used for user data transmission in time.

Indication information of delay transmission, which indicates that the fourth node is required to delay the transmission of a message of the user, that is, after the fourth node receives the message of the user, according to the indication information, the fourth node will not immediately transmit the message to the user. In an embodiment, the message of the user may be the connection release message (such as an RRC Release message). The technical effect of this information is to assist the fourth node to determine an occasion for transmitting the user messages, and to avoid early or late configuration of the user and waste of wireless resources.

Step 2-2: the fourth node transmits a fourth message to the third node, which is used to provide the third node with configuration information related to the user. Further, the information may be configuration information related to small data transmission of the user, and the message includes at least one of the following information:

Identification information of the user, which may be used to indicate a user targeted by the third message, such as a gNB-CU UE F1AP ID, and may be used to indicate a user targeted by the fourth message, such as a gNB-CU UE F1AP ID and a gNB-DU UE F1AP ID. In an embodiment, the information may contain one identifier, and in another embodiment, the information may contain two or more identifiers.

Seventh indication information related to the user, which is used to indicate a behavior of the user. After receiving the indication information, the third node will transmit the indication information to the user according to the indication information, or determine its signaling interaction with the user according to the indication information, or transmit the indication information to other nodes. The information includes at least one of the following information:

Seventh indication information of arrival of non-small data, which is used to indicate the arrival of the non-small data. Further, this information may also be used to indicate that the arrived non-small data is an uplink packet and/or a downlink packet.

Seventh indication information of non-small data transmission, which is used to indicate that the user is required to perform the non-small data transmission.

Seventh indication information of starting of a connection resume procedure, which is used to indicate the user to perform the connection resume procedure.

Seventh indication information of entering of a connected state, which is used to indicate that the user may enter the connected state.

The technical effect of the above-mentioned "seventh indication information related to the user" is to determine the state of the user and assist the third node to determine the configuration information transmitted to the user.

Third container related to user messages, the user messages included in this container are messages transmitted by the user, which may contain eighth indication information related to the user that is used to indicate a behavior of the user. After receiving the indication information, the third node will transmit the indication information to the user according to the indication information, or determine its signaling interaction with the user according to the indication information, or transmit the indication information to other nodes. The information includes at least one of the following information:

Eighth indication information of arrival of non-small data, which is used to indicate the arrival of the non-small data. Further, this information may also be used to indicate that the arrived non-small data is an uplink packet and/or a downlink packet.

Eighth indication information of non-small data transmission, which is used to indicate that the user is required to perform the non-small data transmission.

Eighth indication information of starting of a connection resume procedure, which is used to indicate the user to perform the connection resume procedure.

Eighth indication information of entering of a connected state, which is used to indicate that the user may enter the connected state.

The technical effect of the above-mentioned "third container related to user messages" is to determine the state of the user and assist the third node to determine the configuration information transmitted to the user.

Indication information of radio bearers, which indicates the radio bearers used for transmitting the information included in the fourth message, such as SRB0, SRB1, SRB2, SRB3, etc. This information may assist the third node to determine the radio bearers for the received user messages, thereby determining the processing method for the user messages and avoiding unnecessary resource waste.

Fourth information related to configured grant, which is used to configure the user to perform small data transmission. The information configures resources used for transmitting small data (e.g., uplink resources, such as a PUSCH), and includes at least one of the following information:

Identification information of a configuration, configID;

Start time parameter information for configured grant, which indicates position information for configured grant, and includes at least one of period and offset information, start System Frame Number (SFN) information, and start subframe information;

Number information of occasions for configured grant, which indicates a number of the occasions for configured grant;

Setting information of a time alignment timer for configured grant;

RNTI (Radio Network Temporary Identifier) information for configured grant;

Frequency modulation configuration information of a PDSCH for configured grant;

Configuration information of a PUCCH for configured grant;

Configuration information of a PUSCH for configured grant;

Implicit release configuration information for configured grant (implicitReleaseAfter). In an embodiment, this information indicates a number of occasions for configured grant that may be skipped in the case of implicit release configured grant; and UL Grant Information for configured grant.

The information included in the above "fourth information related to configured grant" may be referred to PURConfig in the standard, and may also be referred to information elements (such as ConfigGrant-Config, CGrantConfig, etc.) of configuration information for configured grant defined in the standard. The technical effect of the "fourth information related to configured grant" is to provide the third node with the configuration information for configured grant for the user, so as to assist the third node to configure the user for small data transmission.

Fourth indication information of termination of small data transmission, which is used to indicate that the user may terminate the small data transmission. The technical effect of the indication information is to assist the third node to release user resources and reduce resource waste.

Fourth indication information of no small data, which is used to indicate that the user has no small data for transmission. The technical effect of the indication information is that it may assist the third node to obtain the state of small data transmission of the user and assist the third node to release resources used for user data transmission in time.

Second lower layer configuration information, which is used to provide configuration information related to data. In an embodiment, the configuration information is about all data (all radio bearers, or all PDU sessions, or all QoS flows). In another embodiment, the configuration information is configuration information about small data (a bearer of small data, or a PDU session of small data, or a QoS flow of small data). In another embodiment, the configuration information is configuration information about small data based on random access (a bearer of small data, or a PDU session of small data, or a QoS flow of small data). In another embodiment, the configuration information is configuration information about small data based on configured grant (a bearer of small data, or a PDU session of small data, or a QoS flow of small data). The configuration information includes at least one of the following information:

Configuration information included in CellGroupConfig; and

RLC bearer configuration information (such as RLCBearerConfig), which includes at least one of the following information:

Configuration information of RLC;

Configuration information of logical information;

Identification information of logical channels;

Identification information of bearers;

Configuration information of RLC; and

Configuration information of logical channels.

The contents included in the above information may be referred to definitions in the standard. In an embodiment, the information included in the above "second lower layer configuration information" may be transmitted to the first node in an RRC container, and in another embodiment, the information included in the above "second lower layer configuration information" may be transmitted to the first node in one or more information elements. The abovementioned "second lower layer configuration information" may be transmitted based on a request of the third node, or it may be transmitted by the fourth node proactively. The technical effect of the above-mentioned "second lower layer configuration information" is to provide the latest configuration information for the third node, thus assisting the third node to configure the small data transmission of the user.

FIG. 7 illustrates one of the execution methods of step 2-1 and step 2-2, which may be at least one of the following methods:

Step 2-1 is performed before step 2-2, then the fourth message is a response message for the third message.

Step 2-2 is performed before step 2-1, then the third message is a response message for the fourth message.

Step 2-1 is performed separately.

Step 2-2 is performed separately.

The third message in the above procedure may be a PAGING message, a DL RRC Message Transfer message, a UE CONTEXT SETUP/MODIFICATION REQUEST message, a UE CONTEXT MODIFICATION CONFIRM message, or may also be a newly defined message.

The second message in the above procedure may be a UE CONTEXT SETUP/MODIFICATION RESPONSE, or a UL RRC MESSAGE TRANSFER message, an INITIAL UL RRC MESSAGE TRANSFER message, or a UE CONTEXT MODIFICATION REQUIRED message, or may also be a newly defined message.

The advantages of the above procedure at least include: 1) assisting the fourth node to determine the user corresponding to the received message, and then determining whether the user is performing the small data transmission or whether the context of the user needs to be released; 2) transferring the RRC message for the user or updating the RRC message for the user to configure the user; 3) interacting the configuration information for the user to configure user data transmission.

Figure 8:
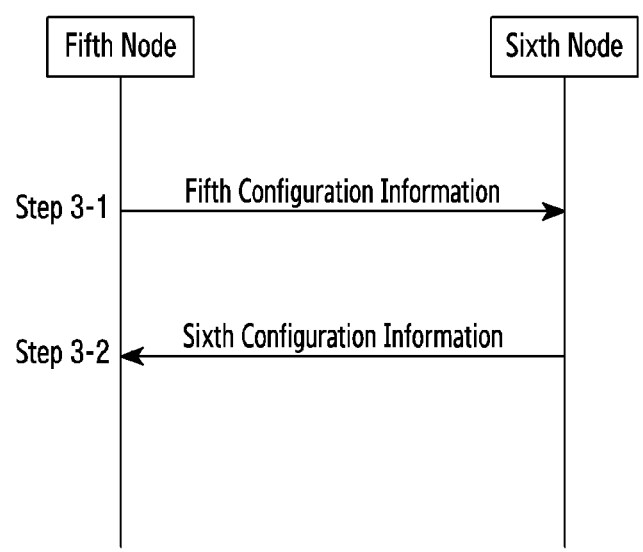
FIG. 8 illustrates a procedure between a fifth node and a sixth node according to an embodiment of the disclosure.

FIG. 8 illustrates a procedure between a fifth node and a sixth node according to an embodiment of the disclosure.

Referring to FIG. 8, this procedure occurs between the fifth node and the sixth node. The function of this procedure is to configure a user for data transmission. The procedure at least includes at least one of the following steps:

Step 3-1: the fifth node transmits a fifth message to the sixth node, which is used to configure the user, including a configuration related to small data transmission or a configuration of a connected state. The message may be an RRC message or a message (such as a MAC control element)

transmitted by a MAC layer to the user. The message includes at least one of the following information:

Ninth indication information related to the user, which is used to indicate a behavior of the user. After receiving the indication information, the sixth node will determine a subsequent operation (such as initiating a new connection resume procedure) according to the indication information. The information includes at least one of the following information:

Ninth indication information of arrival of non-small data, which is used to indicate the arrival of the non-small data. Further, this information may also be used to indicate that the arrived non-small data is an uplink packet and/or a downlink packet.

The ninth indication information of non-small data transmission, which is used to indicate that the user is required to perform the non-small data transmission.

Ninth indication information of starting of a connection resume procedure, which is used to indicate the user to perform the connection resume procedure.

Ninth indication information of entering of a connected state, which is used to indicate that the user may enter the connected state.

Ninth indication information of paging of the user, which is used to indicate that the user is paged.

The technical effect of the "ninth indication information related to the user" is to assist the user to obtain the latest state, and the user may determine a subsequent operation (such as starting a resume procedure) according to the state, so as to assist the user to perform user data transmission as quickly as possible.

Fourth information related to security, which is used to assist the user to update configurations related to security or generate new keys. In an embodiment, this information may be a next hop chaining count (NextHopChainingCount). The technical effect of this information is to assist the user to obtain the latest security configuration, so that the user may use it in subsequent communication and avoid using a different security configuration from the network side for communication.

Fifth indication information of termination of small data transmission, which is used to indicate that the user may terminate the small data transmission. The technical effect of this information is to indicate a behavior of the user and avoid resource waste of the user or data transmission latency.

Fifth indication information of no small data, which is used to indicate that the user has no small data for transmission. The technical effect of this information is to indicate a behavior of the user and avoid resource waste of the user or data transmission latency.

Fourth container related to user messages, which includes the user messages. In another embodiment, the container is the messages of the user. The user messages included in the container may be at least one of the following messages: 1) a connection release message (such as an RRC Release message); 2) a connection resume message (such as an RRCResume message); 3) a reconfiguration message (such as an RRCReconfiguration message, which may also be a handover command message that indicates the user to perform handover, such as an RRCReconfiguration message containing synchronization information); 4) other existing RRC messages; and 5) a new RRC message. The above user messages may also include the following information:

Tenth indication information related to the user, which is used to indicate a behavior of the user. The indication information will be transmitted to the user along with the user messages, and the user will perform subsequent operations according to the information, such as initiating a new resume process and transmitting a connection resume request message, etc. The information includes at least one of the following information:

Tenth indication information of arrival of non-small data, which is used to indicate the arrival of the non-small data of the user. Further, this information may also be used to indicate that the arrived non-small data is an uplink packet and/or a downlink packet.

Tenth indication information of non-small data transmission, which is used to indicate that the user is required to perform the non-small data transmission.

Tenth indication information of starting of a connection resume procedure, which is used to indicate the user to perform the connection resume procedure.

Tenth indication information of entering of a connected state, which is used to indicate that the user may enter the connected state.

Fifth information related to security, which is used to assist the user to update configurations related to security or generate new keys. In an embodiment, this information may be a next hop chaining count (NextHopChainingCount).

Fifth information related to configured grant, which is used to configure the user to perform small data transmission. The information configures resources used for transmitting small data (e.g., uplink resources, such as a PUSCH), and includes at least one of the following information:

Identification information of a configuration, configID;

Start time parameter information for configured grant, which indicates position information for configured grant, and includes at least one of period and offset information, start System Frame Number (SFN) information, and start subframe information;

Number information of occasions for configured grant, which indicates a number of the occasions for configured grant;

Setting information of a time alignment timer for configured grant;

RNTI (Radio Network Temporary Identifier) information for configured grant;

Frequency modulation configuration information of a PDSCH for configured grant;

Configuration information of a PUCCH for configured grant;

Configuration information of a PUSCH for configured grant;

Implicit release configuration information for configured grant (implicitReleaseAfter). In an embodiment, this information indicates a number of occasions for configured grant that may be skipped in the case of implicit release configured grant; and UL Grant Information for configured grant.

The information included in the above "third information related to configured grant" may be referred to PUR-Config in the standard, and may also be referred to information elements (such as ConfigGrant-Config, CGrant-Config, etc.) of configuration information for configured grant defined in the standard.

The technical effect of the above-mentioned "fourth container related to user messages" is to configure the user for data transmission, which may assist the small data transmission or assist the user to perform data transmission after entering the connected state.

Step 3-2: the sixth node transmits a sixth message to the fifth node, which is used to indicate a behavior of the user, including a behavior related to small data transmission. The message may be an RRC message. The message includes at least one of the following information:

Tenth indication information of arrival of non-small data, which is used to indicate the arrival of the non-small data. Further, this information may also be used to indicate that the arrived non-small data is an uplink packet and/or a downlink packet.

Tenth indication information of non-small data transmission, which is used to indicate that the user is required to perform the non-small data transmission.

Tenth indication information of starting of a connection resume procedure, which is used to indicate the user to perform the connection resume procedure.

Tenth indication information of entering of a connected state, which is used to indicate that the user may enter the connected state.

Sixth indication information of termination of small data transmission, which is used to indicate that the user may terminate the small data transmission.

Sixth indication information of no small data, which is used to indicate that the user has no small data for transmission.

The technical effect of the above information is to provide the state of user data transmission to the network side, thereby assisting the network side to determine the configuration of the user and avoiding resource waste caused by untimely update of the user state.

FIG. 8 illustrates one of the execution methods of step 3-1 and step 3-2, which may be at least one of the following methods:

Step 3-1 is performed before step 3-2.
Step 3-2 is performed before step 3-1.
Step 3-1 is performed separately.
Step 3-2 is performed separately.

The fifth message in the above procedure may be an RRC Release message, an RRC Resume message, or an RRC RECONFIGURATION message, or a MAC CE, or may also be a newly defined message.

The sixth message in the above procedure may be an RRC RESUME REQUEST message, or a MAC CE, or may also be a newly defined message.

The advantages of the above procedure at least include: 1) assisting the user to determine the arrival of user data; 2) assisting the user to start the user connection resume procedure, and 3) indicating the arrival of user data to the network side.

The above multiple procedures may be performed separately or in combination with each other. In order to further illustrate mutual combinations of the above procedures, the disclosure provides the following different embodiments for different technical problems. The information included in each message in the following embodiments may be referred to the description in the above multiple procedures.

FIGS. 9, 10, 11, 12, 13, 14, and 15 illustrate a procedure of a user entering a connected state in a process of small data transmission according to various embodiments of the disclosure.

At present, there is a technical problem of how the user enter the connected state in the process of small data transmission, which occurs in the process of small data transmission. When the user performs the small data transmission, there will be arrival of non-small data of the user (the data does not belong to a bearer of small data or a PDU session of small data or a flow of small data), for example, the non-small data (downlink non-small data) arrives at an anchor node of the user, or the non-small data (uplink non-small data) arrives at the user. At this time, the user is required to enter the connected state to transmit the user data (especially transmitting non-small data), and the user is required to enter the connected state as quickly as possible, which can reduce delay of the user data transmission. In order to solve this technical problem, signaling interaction among the anchor node, a serving node and the user is needed. Taking downlink non-small data arriving at the anchor node as an example, the possible signaling interaction procedure is given below.

Figure 9:
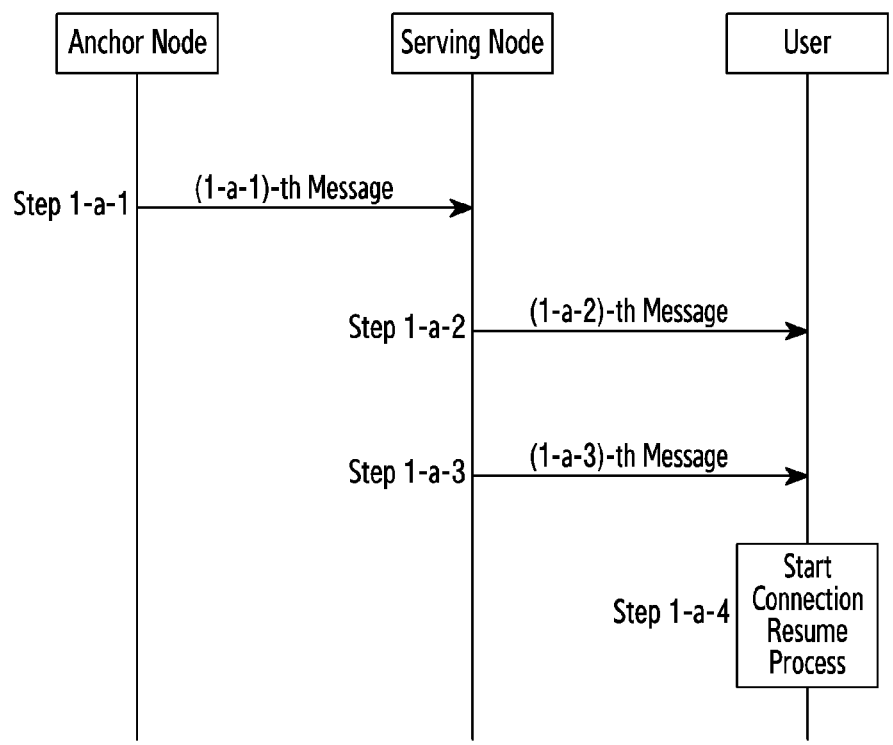
FIGS. 9, 10, 11, 12, 13, 14, and 15 illustrate a procedure of a user entering a connected state in a process of small data transmission according to various embodiments of the disclosure.

Referring to FIG. 9, a method for transmitting a paging message to a user after transmitting a release message to the user is shown, which includes at least one of the following steps:

Step 1-a-1: an anchor node (or a central unit of the anchor node, or a control plane part of the central unit of the anchor node, or a user plane part of the central unit of the anchor node) transmits a (1-a-1)-th message to a serving node (or a central unit of the serving node, or a control plane part of the central unit of the serving node, or a user plane part of the central unit of the serving node), which may be an RAN PAGING message or other messages. The contents included in this message may be referred to the first message in step 1-1 above, such as the identification information related to the user, which may include at least one of the following information:

Identification information of the user for small data transmission;
First identification information of the user;
Identification information of inactivity;
User context identification information;
Integrity protection information; and
Identification information of a new cell.

The above information may assist the serving node to identify the user targeted by the (1-a-1)-th message, and further determine whether the user is performing the small data transmission.

Step 1-a-2: the serving node transmits a (1-a-2)-th message to the user, which may be a connection release message. When the serving node consists of a central unit and a distributed unit, this step includes that the central unit transmits the connection release message to the distributed unit, and then the distributed unit transmits the connection release message to the user.

Step 1-a-3: the serving node transmits a (1-a-3)-th message to the user, which may be a paging message. When the serving node consists of a central unit and a distributed unit, this step includes that the central unit transmits the paging message to the distributed unit, and then the distributed unit transmits the paging message to the user.

Step 1-a-4: the user starts a connection resume process and enters a connected state for user data transmission.

The method has the advantages that the serving node may determine the user (or a paged user) that is required to be converted into the connected state according to the received information (the identification information related to the user) from the anchor node, and know that the user is performing the small data transmission, so that the serving node requests the user (the paged user) to initiate a connection establishment process after releasing the user, and the process of the user entering the connected state is accelerated.

Figure 10:
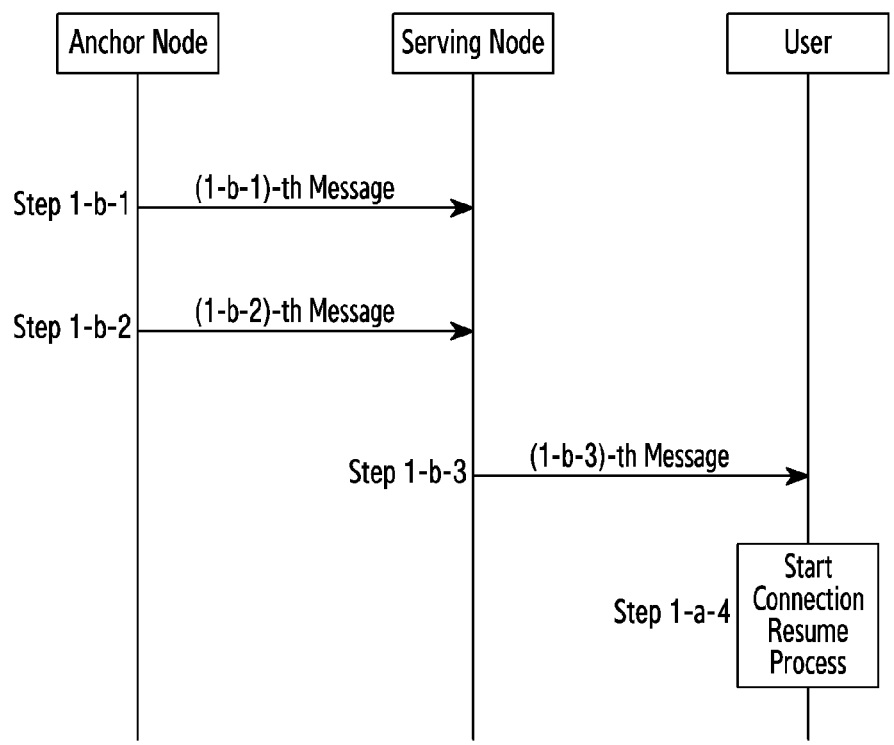

Referring to FIG. 10, a method for notifying an anchor node to transmit a paging message after a serving node releases a user is shown, which includes at least one of the following steps:

Step 1-b-1: the serving node (or a central unit of the serving node, or a control plane part of the central unit of the serving node, or a user plane part of the central unit of the serving node) transmits a (1-b-1)-th message to the anchor node (or a central unit of the anchor node, or a control plane part of the central unit of the anchor node, or a user plane part of the central unit of the anchor node), where the contents included in this message may be referred to the second message in step 1-2 above, such as the second indication information of a user state.

Step 1-b-2: the anchor node (or the central unit of the anchor node, or the control plane part of the central unit of the anchor node, or the user plane part of the central unit of the anchor node) transmits a (1-b-2)-th message to the serving node (or the central unit of the serving node, or the control plane part of the central unit of the serving node, or the user plane part of the central unit of the serving node), which may be an RAN PAGING message.

Step 1-b-3: the serving node transmits a (1-b-3)-th message to the user, which may be a paging message. When the serving node consists of a central unit and a distributed unit, this step includes that the central unit transmits the paging message to the distributed unit, and then the distributed unit transmits the paging message to the user.

Step 1-b-4: the user starts a connection resume process and enters a connected state for user data transmission.

The method has the advantages that the anchor node transmits the paging message immediately after knowing that the user terminated the small data transmission, thus accelerating the process of the user entering the connected state.

Figure 11:
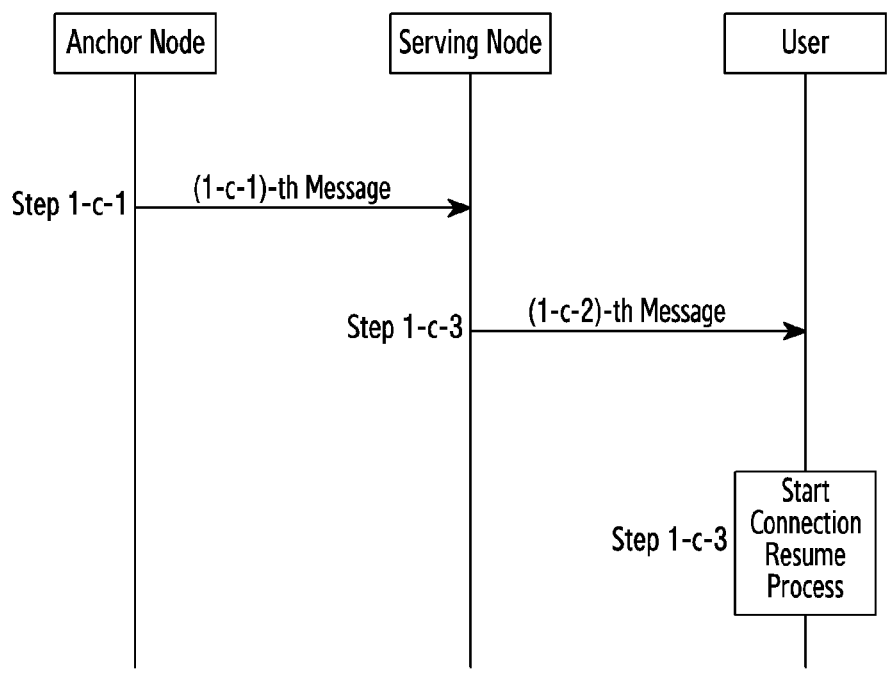

Referring to FIG. 11, a method for informing a user that the user is required to enter a connected state through a process of release of the user is shown, which includes at least one of the following operations:

Step 1-c-1: an anchor node (or a central unit of the anchor node, or a control plane part of the central unit of the anchor node, or a user plane part of the central unit of the anchor node) transmits a (1-c-1)-th message to a serving node (or a central unit of the serving node, or a control plane part of the central unit of the serving node, or a user plane part of the central unit of the serving node), where the contents included in this message may be referred to the first message in step 1-1 above, such as the first indication information related to the user, or the first container related to user messages.

Step 1-c-2: the serving node transmits a (1-c-2)-th message to the user. The contents included in this message may be referred to the fifth message in step 3-1 above, such as the ninth indication information related to the user, the fourth information related to security, or the fourth container related to user messages (user messages included in this container may be a connection release message or a connection resume message). When the serving node consists of a central unit and a distributed unit, This step includes that the central unit transmits a (1-c-2a)-th message (the contents included in this message may be referred to the third message in step 2-1 above, such as the fifth indication information related to the user, or the second container related to user messages) to the distributed unit, and then the distributed unit transmits a (1-c-2b)-th message (the contents included in this message may be referred to the fifth message in step 3-1 above, such as the ninth indication information related to the user, the fourth information related to security, or the fourth container related to user messages) to the user.

Step 1-c-3: the user starts a connection resume process and enters a connected state for user data transmission.

The method has the advantages that when the serving node transmits the message to the user, it may indicate the user to enter the connected state, thus accelerating the process of the user entering the connected state.

Figure 12:
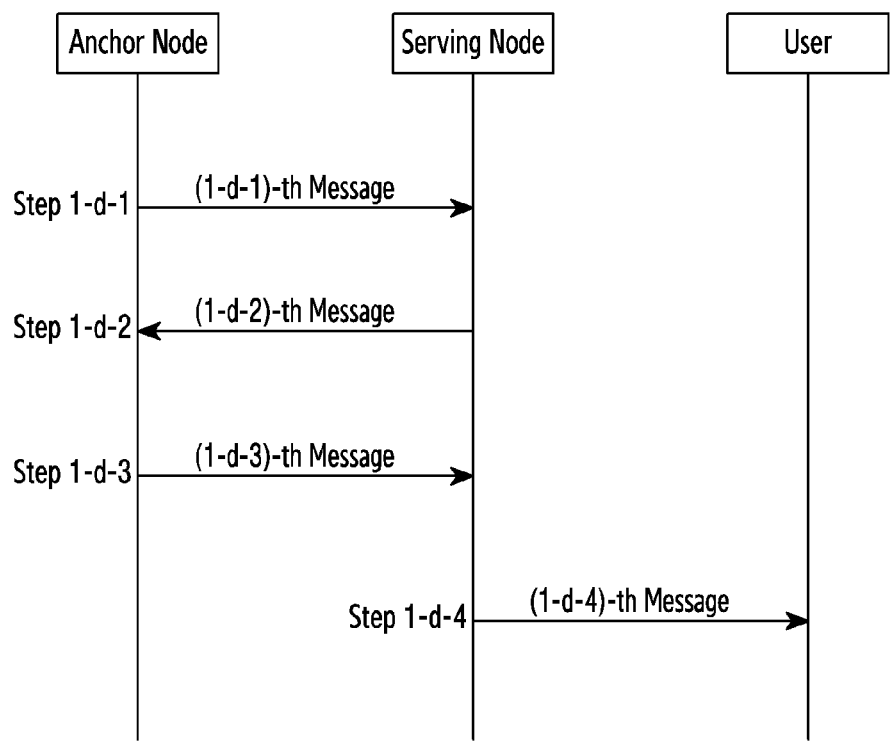

Referring to FIG. 12, a method for an anchor node to convert a user into a connected state through a handover procedure is shown, which includes at least one of the following steps.

In this method, the user is an inactive state and is performing small data transmission. When the anchor node knows arrival of non-small data, the anchor node starts the handover procedure for the user.

Step 1-d-1: the anchor node (or a central unit of the anchor node, or a control plane part of the central unit of the anchor node, or a user plane part of the central unit of the anchor node) transmits a (1-d-1)-th message to a serving node (or a central unit of the serving node, or a control plane part of the central unit of the serving node, or a user plane part of the central unit of the serving node), where the contents included in this message may be referred to the first message in step 1-1 above, such as the identification information related to the user. In an example, the message may be an existing handover request message or a defined new message.

Step 1-d-2: the serving node (or the central unit of the serving node, or the control plane part of the central unit of the serving node, or the user plane part of the central unit of the serving node) transmits a (1-d-2)-th message to the anchor node (or the central unit of the anchor node, or the control plane part of the central unit of the anchor node, or the user plane part of the central unit of the anchor node), where the contents included in this message may be referred to the second message in step 1-2 above. In an example, the message may be an existing handover request response message or a defined new message.

Step 1-d-3: the anchor node (or the central unit of the anchor node, or the control plane part of the central unit of the anchor node, or the user plane part of the central unit of the anchor node) transmits a (1-d-3)-th message to the serving node (or the central unit of the serving node, or the control plane part of the central unit of the serving node, or the user plane part of the central unit of the serving node), where the contents included in this message may be referred to the first message in step 1-1 above, such as the first container related to user messages. This message is used to transmit the message for configuring the user that is generated by the anchor node (or a PDCP PDU of the generated message for configuring the user) to the serving node.

Step 1-d-4: the serving node (or the central unit of the serving node, or the control plane part of the central unit of the serving node, or the user plane part of the central unit of the serving node) transmits a (1-d-4)-th message to the user, which configures the user, and further, the user may enter the connected state. In an example, the message may be a handover command. The contents included in this message may be referred to the fifth message in step 3-1 above.

When the serving node includes a central unit and a distributed unit, at least one of the following operations may further be included after the above step 1-d-2:

Step 1-d-2a: the central unit (or the control plane part of the central unit) of the serving node transmits a (1-d-2a)-th message to the distributed unit of the serving node, where the contents included in this message may be referred to the third message in step 2-1 above.

Step 1-d-2b: the distributed unit of the serving node transmits a (1-d-2b)-th message to the central unit (or the control plane part of the central unit) of the serving node, where the contents included in this message may be referred to the fourth message in step 2-2 above.

Step 1-d-1a may further be included before step 1-d-1: the serving node (or the central unit of the serving node, or the control plane part of the central unit of the serving node, or the user plane part of the central unit of the serving node) transmits a (1-d-1a)-th message to the anchor node (or the central unit of the anchor node, or the control plane part of the central unit of the anchor node, or the user plane part of the central unit of the anchor node), and the contents included in this message may be referred to the second message in step 1-2 above, such as the PLMN ID.

The method has the advantages that the user may enter the connected state in the procedure of small data transmission, thus accelerating the entering of the user to the connected state.

Figure 13:
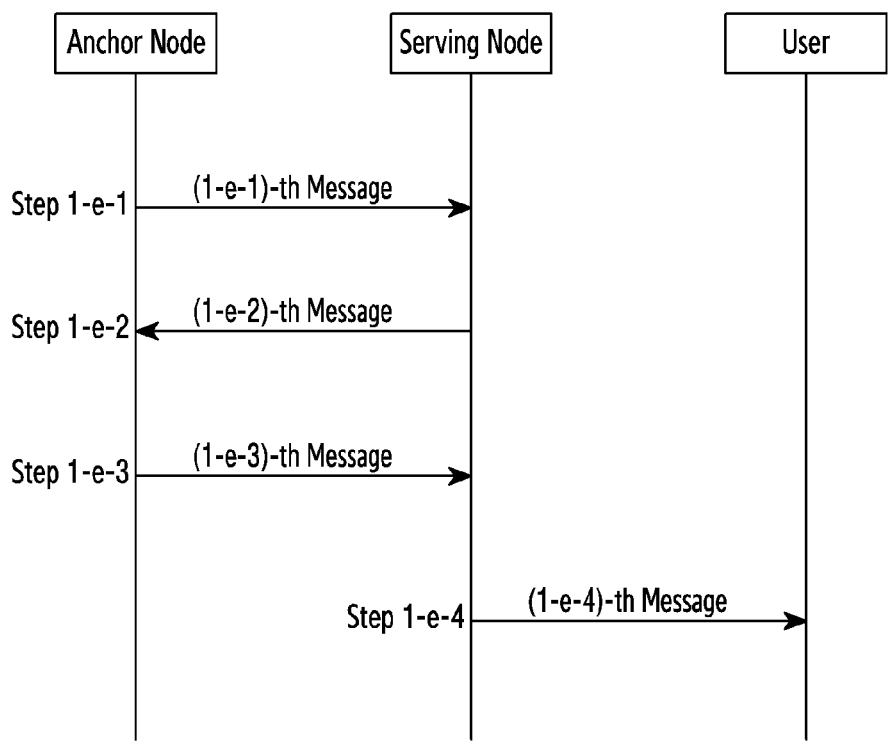

Referring to FIG. 13, a method for user context transmission initiated by an anchor node proactively is shown, which includes at least one of the following operations:

Step 1-e-1: the anchor node (or a central unit of the anchor node, or a control plane part of the central unit of the anchor node, or a user plane part of the central unit of the anchor node) transmits a (1-e-1)-th message to a serving node (or a central unit of the serving node, or a control plane part of the central unit of the serving node, or a user plane part of the central unit of the serving node), which is used to transmit a context of the user to the serving node. The contents included in this message may be referred to the first message in step 1-1 above, such as the message related to user context.

Step 1-e-2: the serving node (or the central unit of the serving node, or the control plane part of the central unit of the serving node, or the user plane part of the central unit of the serving node) transmits a (1-e-2)-th message to the anchor node (or the central unit of the anchor node, or the control plane part of the central unit of the anchor node, or the user plane part of the central unit of the anchor node), which is used to transmit user messages generated by the serving node to the anchor node. The contents included in this message may be referred to the second message in step 1-2 above, such as the first user message.

Step 1-e-3: the anchor node (or the central unit of the anchor node, or the control plane part of the central unit of the anchor node, or the user plane part of the central unit of the anchor node) transmits a (1-e-3)-th message to the serving node (or the central unit of the serving node, or the control plane part of the central unit of the serving node, or the user plane part of the central unit of the serving node), where the contents included in this message may be referred to the first message in step 1-1 above, such as the first container related to user messages. This message is used to transmit the message for configuring the user that is generated by the anchor node (or a PDCP PDU of the generated message for configuring the user) to the serving node.

Step 1-e-4: the serving node (or the central unit of the serving node, or the control plane part of the central unit of the serving node, or the user plane part of the central unit of the serving node) transmits a (1-e-4)-th message to the user, which is used to configure the user, and further, the user may enter a connected state. In an example, the message may be a connection resume message. The contents included in this message may be referred to the fifth message in step 3-1 above.

When the serving node includes a central unit and a distributed unit, at least one of the following operations may further be included after the above step 1-e-2:

Step 1-e-2a: the central unit (or the control plane part of the central unit) of the serving node transmits a (1-e-2a)-th message to the distributed unit of the serving node, where the contents included in this message may be referred to the third message in step 2-1 above.

Step 1-e-2b: the distributed unit of the serving node transmits a (1-e-2b)-th message to the central unit (or the control plane part of the central unit) of the serving node, where the contents included in this message may be referred to the fourth message in step 2-2 above.

The method has the advantages that the anchor node may proactively initiate the transmitting of the user context, and the user may enter the connected state in the procedure of small data transmission, thus accelerating the entering of the user to the connected state.

Figure 14:
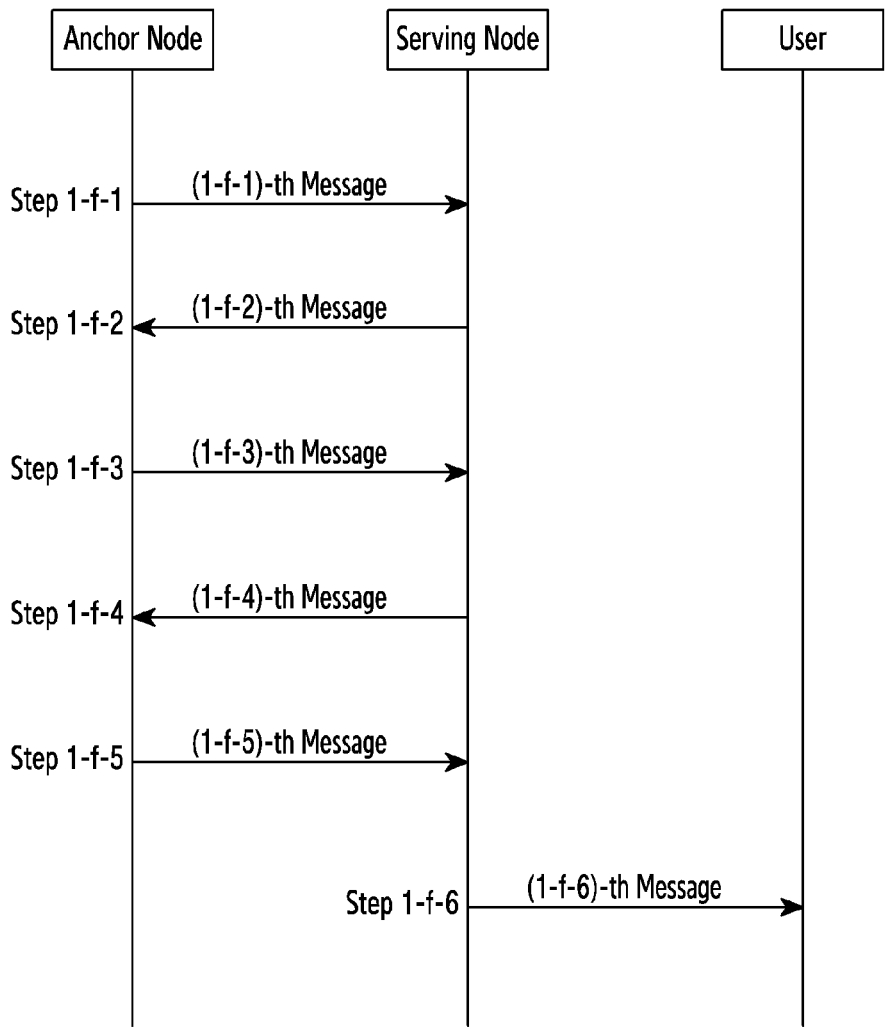

Referring to FIG. 14, a method for an anchor node to trigger a serving node to initiate a user context acquisition procedure again is shown, which includes at least one of the following operations:

Step 1-f-1: the anchor node (or a central unit of the anchor node, or a control plane part of the central unit of the anchor node, or a user plane part of the central unit of the anchor node) transmits a (1-f-1)-th message to the serving node (or a central unit of the serving node, or a control plane part of the central unit of the serving node, or a user plane part of the central unit of the serving node), which is used to trigger a procedure of the user entering a connected state. The contents included in this message may be referred to the first message in step 1-1 above, such as the first indication information related to the user.

Step 1-f-2: the serving node (or the central unit of the serving node, or the control plane part of the central unit of the serving node, or the user plane part of the central unit of the serving node) transmits a (1-f-2)-th message to the anchor node (or the central unit of the anchor node, or the control plane part of the central unit of the anchor node, or the user plane part of the central unit of the anchor node), which is used to request a context of the user from the anchor node. The contents included in this message may be referred to the second message in step 1-2 above.

Step 1-f-3: the anchor node (or the central unit of the anchor node, or the control plane part of the central unit of the anchor node, or the user plane part of the central unit of the anchor node) transmits a (1-f-3)-th message to the serving node (or the central unit of the serving node, or the control plane part of the central unit of the serving node, or the user plane part of the central unit of the serving node), which is used to transmit the context of the user. The contents included in this message may be referred to the first message in step 1-1 above.

Step 1-f-4: the serving node (or the central unit of the serving node, or the control plane part of the central unit of the serving node, or the user plane part of the central unit of the serving node) transmits a (1-f-4)-th message to the anchor node (or the central unit of the anchor node, or the control plane part of the central unit of the anchor node, or the user plane part of the central unit of the anchor node), which is used to transmit user messages generated by the serving node to the anchor node. The contents included in this message may be referred to the second message in step 1-2 above, such as the first user message.

Step 1-f-5: the anchor node (or the central unit of the anchor node, or the control plane part of the central unit of the anchor node, or the user plane part of the central unit of the anchor node) transmits a (1-f-5)-th message to the serving node (or the central unit of the serving node, or the control plane part of the central unit of the serving node, or the user plane part of the central unit of the serving node), where the contents included in this message may be referred to the first message in step 1-1 above. This message is used to transmit the message for configuring the user that is generated by the anchor node (or a PDCP PDU of the generated message for configuring the user) to the serving node.

Step 1-f-6: the serving node (or the central unit of the serving node, or the control plane part of the central unit of the serving node, or the user plane part of the central unit of the serving node) transmits a (1-f-6)-th message to the user, which is used to configure the user, and further, the user may enter the connected state. In an example, the message may be a connection resume message. The contents included in this message may be referred to the fifth message in step 3-1 above.

When the serving node includes a central unit and a distributed unit, at least one of the following operations may further be included after the above step 1-f-3:

Step 1-f-3a: the central unit (or the control plane part of the central unit) of the serving node transmits a (1-f-3a)-th message to the distributed unit of the serving node, where the contents included in this message may be referred to the third message in step 2-1 above.

Step 1-f-3b: the distributed unit of the serving node transmits a (1-f-3b)-th message to the central unit (or the control plane part of the central unit) of the serving node, where the contents included in this message may be referred to the fourth message in step 2-2 above.

The method has the advantages that when a packet of non-small data arrives, the anchor node and the serving node may interact with each other, for configuring the user to enter the connected state in the procedure of small data transmission, thereby accelerating the entering of the user to the connected state.

Figure 15:
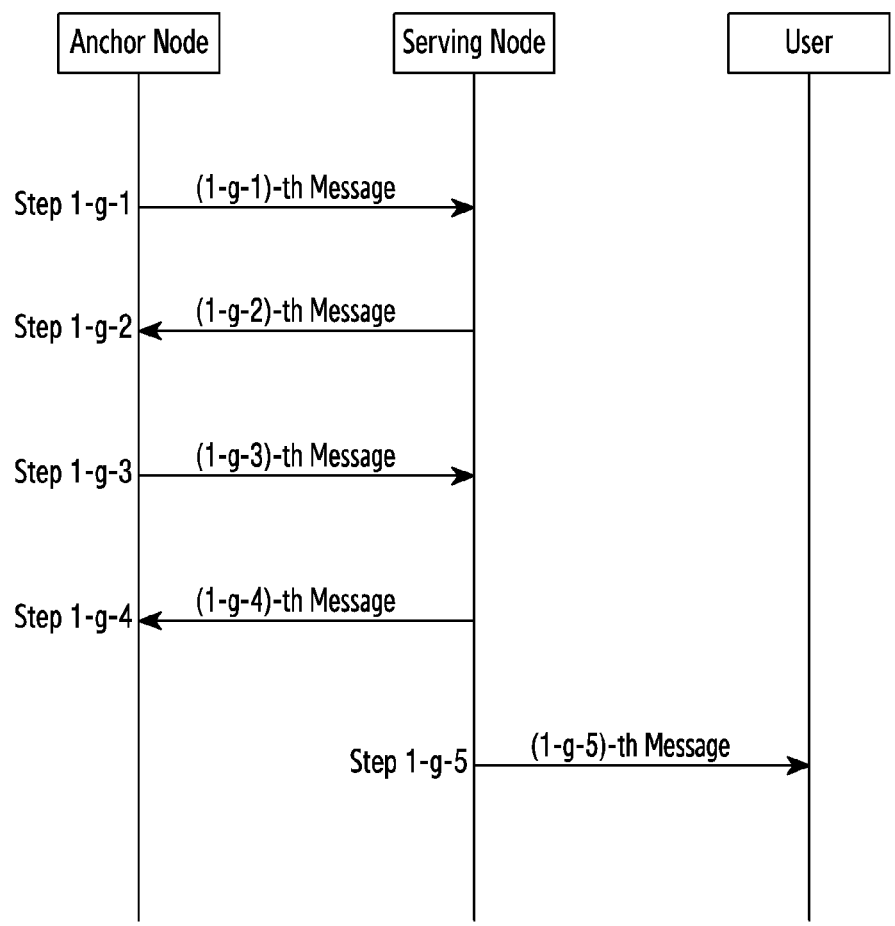

Referring to FIG. 15, a method for a serving node to proactively initiate an acquisition procedure of a user context so that a user enters a connected state is shown, which includes at least one of the following operations:

Step 1-g-1: the serving node (or a central unit of the serving node, or a control plane part of the central unit of the serving node, or a user plane part of the central unit of the serving node) transmits a (1-g-1)-th message to an anchor node (or a central unit of the anchor node, or a control plane part of the central unit of the anchor node, or a user plane part of the central unit of the anchor node), which is used to request a context of the user from the anchor node. The contents included in this message may be referred to the second message in step 1-2 above.

Step 1-g-2: the anchor node (or the central unit of the anchor node, or the control plane part of the central unit of the anchor node, or the user plane part of the central unit of the anchor node) transmits a (1-g-2)-th message to the serving node (or the central unit of the serving node, or the control plane part of the central unit of the serving node, or the user plane part of the central unit of the serving node), which is used to transmit the context of the user. The contents included in this message may be referred to the first message in step 1-1 above.

Step 1-g-3: the serving node (or the central unit of the serving node, or the control plane part of the central unit of the serving node, or the user plane part of the central unit of the serving node) transmits a (1-g-3)-th message to the anchor node (or the central unit of the anchor node, or the control plane part of the central unit of the anchor node, or the user plane part of the central unit of the anchor node), which is used to transmit user messages generated by the serving node to the anchor node. The contents included in this message may be referred to the second message in step 1-2 above, such as the first user message.

Step 1-g-4: the anchor node (or the central unit of the anchor node, or the control plane part of the central unit of the anchor node, or the user plane part of the central unit of the anchor node) transmits a (1-g-4)-th message to the serving node (or the central unit of the serving node, or the control plane part of the central unit of the serving node, or the user plane part of the central unit of the serving node), where the contents included in this message may be referred to the first message in step 1-1 above, such as the first container related to user messages. This message is used to transmit the message for configuring the user that is generated by the anchor node (or a PDCP PDU of the generated message for configuring the user) to the serving node.

Step 1-g-5: the serving node (or the central unit of the serving node, or the control plane part of the central unit of the serving node, or the user plane part of the central unit of the serving node) transmits a (1-g-5)-th message to the user, which is used to configure the user, and further, the user may enter the connected state. In an example, the message may be a connection resume message. The contents included in this message may be referred to the fifth message in step 3-1 above.

When the serving node includes a central unit and a distributed unit, at least one of the following operations may further be included after the above step 1-g-2:

Step 1-g-2a: the central unit (or the control plane part of the central unit) of the serving node transmits a (1-g-2a)-th message to the distributed unit of the serving node, where the contents included in this message may be referred to the third message in step 2-1 above.

Step 1-g-2b: the distributed unit of the serving node transmits a (1-g-2b)-th message to the central unit (or the control plane part of the central unit) of the serving node, where the contents included in this message may be referred to the fourth message in step 2-2 above.

The method has the advantages that when a packet of non-small data arrives, the anchor node and the serving node may interact with each other, for configuring the user to enter the connected state in the procedure of small data transmission, thereby accelerating the entering of the user to the connected state.

The above multiple methods are all explained by taking the arrival of downlink non-small data at the anchor node as an example. However, the procedures in the above multiple methods are also applicable to other situations (the other situations refer to that the user which is performing the small data transmission is required to enter the connected state, for example, uplink non-small data arrives, and the core network needs the user to enter the connected state, etc.). In addition, if the procedures in the above multiple methods are triggered by the arrival of the uplink non-small data of the user, at least one of the following operations may further be included:

Step 1-h-1: the user transmits a (1-h-1)-th message to the serving node, which is triggered by the arrival of the uplink non-small data. The contents included in this message may be referred to the sixth message in step 3-2 above.

Step 1-h-2: if the serving node includes a central unit and a distributed unit, the above step 1-h-1 denotes that the user transmits the (1-h-1)-th message to the distributed unit of the serving node, and this operation further includes that the distributed unit of the serving node transmits a (1-h-2)-th message to the central unit (or the control plane part of the central unit or the user plane part of the central unit) of the serving node, where the contents included in this message may be referred to the fourth message in step 2-2 above.

Step 1-h-3: the serving node (or the central unit of the serving node, or the control plane part of the central unit of the serving node, or the user plane part of the central unit of the serving node) transmits a (1-h-3)-th message to the anchor node (or the central unit of the anchor node, or the control plane part of the central unit of the anchor node, or the user plane part of the central unit of the anchor node), where the contents included in this message may be referred to the second message in step 1-2 above.

The above three operations may occur before the above step 1-a-1/1-b-1/1-c-1/1-d-1/1-e-1/1-f-1/1-g-1.

Figure 16:
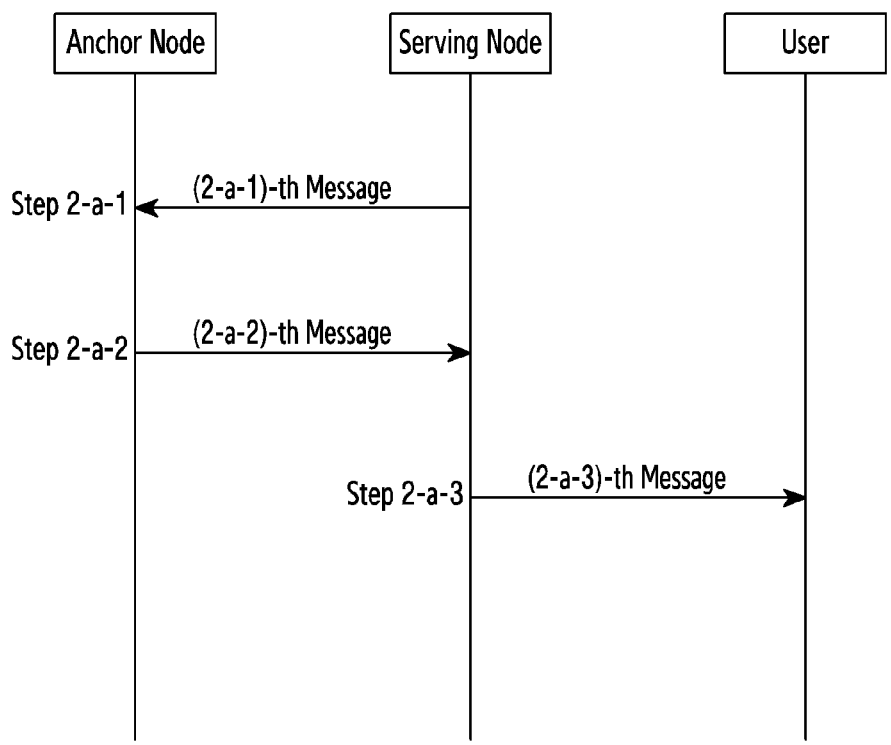
FIGS. 16 and 17 illustrate a procedure of transmitting configuration information for small data transmission of a user according to various embodiments of the disclosure.
Figure 17:
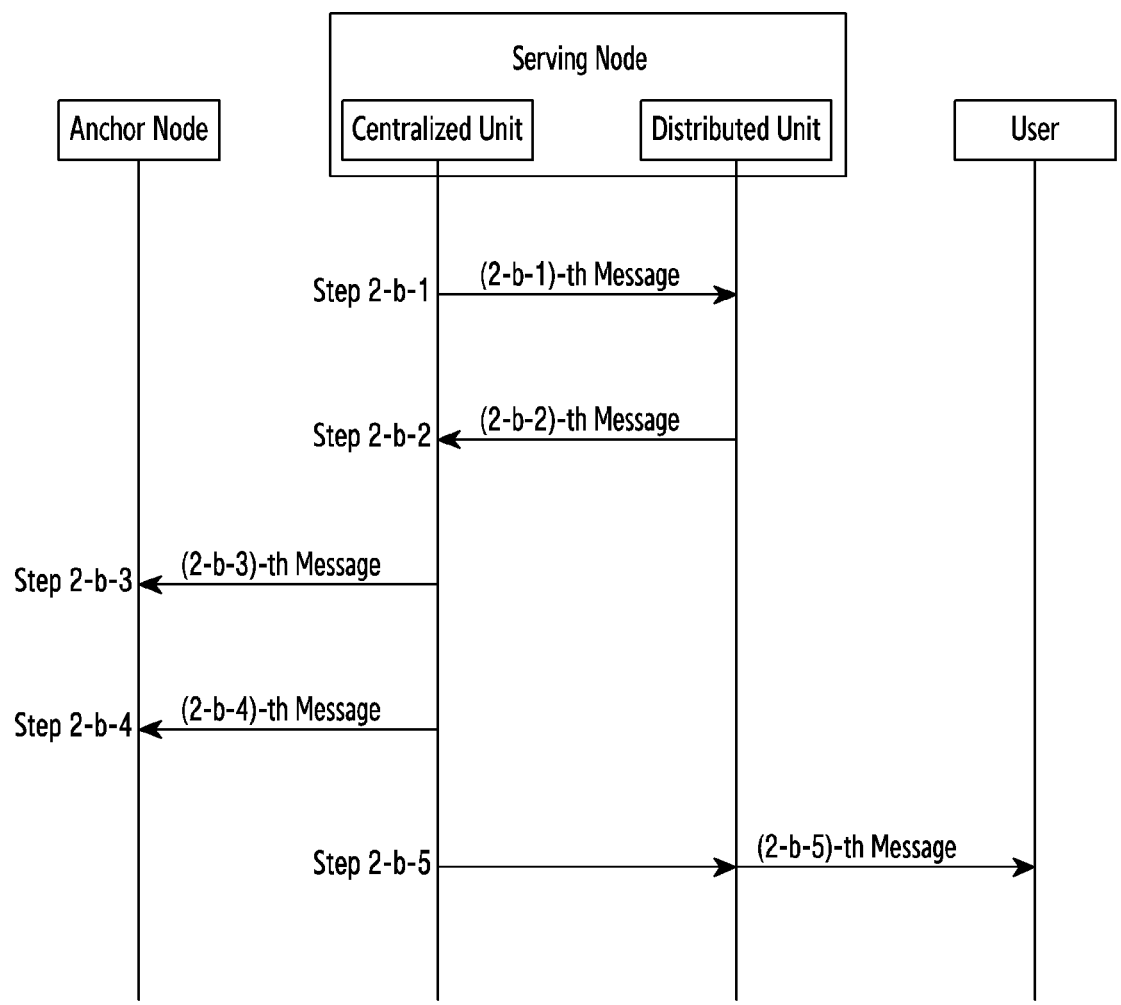

FIGS. 16 and 17 illustrate a procedure of transmitting configuration information for small data transmission of a user according to various embodiments of the disclosure.

At present, there is a technical problem that, when an RRC Release message is transmitted to the user, the message may contain configuration information for configured grant. During small data transmission, a base station (or a distributed unit of the base station) where the user is located may be different from a base station (a distributed unit of the base station) where the user is located before entering an inactive state, that is, the above-mentioned serving node is a node different from an anchor node, or the distributed unit connected by the user when entering the inactive state is different from the distributed unit connected by the user during the small data transmission. The user will enter the inactive state again after completing the small data transmission. At this time, the network side needs to provide the user with the configuration related to small data transmission again, which assists the user to perform small data transmission again. The technical problem in this process is that a node that generates configuration information for small data transmission of the user is different from a node that generates a user configuration message. For example, a serving node generates the configuration information for small data transmission of the user and an anchor node generates the user configuration message. This technical problem causes that the configuration information for small data transmission of the user may not be transmitted to the user. To solve this technical problem, the disclosure proposes the following method.

Referring to FIG. 16, a method for a serving node to provide configuration information for small data transmission of a user to an anchor node is shown, which includes at least one of the following operations:

Step 2-a-1: the serving node (or a central unit of the serving node, or a control plane part of the central unit of the serving node, or a user plane part of the central unit of the serving node) transmits a (2-a-1)-th message to the anchor node (or a central unit of the anchor node, or a control plane part of the central unit of the anchor node, or a user plane part of the central unit of the anchor node), where the contents included in this message may be referred to the second message in step 1-2 above, such as the second information related to configured grant. In an example, the message may be a RETRIEVE UE CONTEXT REQUEST message. In another example, the message may be a newly defined message.

Step 2-a-2: the anchor node (or the central unit of the anchor node, or the control plane part of the central unit of the anchor node, or the user plane part of the central unit of the anchor node) transmits a (2-a-2)-th message to the serving node (or the central unit of the serving node, or the control plane part of the central unit of the serving node, or the user plane part of the central unit of the serving node), which is used to trigger a procedure of the user entering a connected state. The contents included in this message may be referred to the first message in step 1-1 above, such as the first container related to user messages. In an example, the user messages included in this container will include the "first information related to configured grant". In an example, the (2-a-2)-th message may be a RETRIEVE UE CONTEXT FAILURE message.

Step 2-a-3: the serving node (or the central unit of the serving node, or the control plane part of the central unit of the serving node, or the user plane part of the central unit of the serving node) transmits a (2-a-3)-th message to the user, which is used to configure the user. The contents included in this message may be referred to the fifth message in step 3-1 above. The message may be used to terminate the small data transmission of the user.

When the serving node includes a central unit and a distributed unit, the following operation may further be included before the above step 2-a-1:

Step 2-a-0: the distributed unit of the serving node transmits a (2-a-0)-th message to the central unit (or the control plane part of the central unit or the user plane part of the central unit) of the serving node. The contents included in this message may be referred to the fourth message in step 2-2 above, such as the fourth information related to configured grant.

The above procedure may occur in a process of allowing the user to perform the small data transmission (such as a connection resume process initiated by the user), or in a process of the user being performing the small data transmission.

The method has the advantages that the serving node may provide the anchor node with the configuration information related to the small data transmission of the user, for assisting the anchor node to generate the message for configuring the user, and provide the configuration for the user to perform the small data transmission.

Referring to FIG. 17, a method of configuration request initiated by a serving node or an anchor node is shown, which includes at least one of the following operations:

Step 2-b-1: a central unit (or a control plane part of the central unit or a user plane part of the central unit) of the serving node transmits a (2-b-1)-th message to a distributed unit of the serving node. The contents included in this message may be referred to the third message in step 2-1 above, such as the second indication information of configured grant request.

Step 2-b-2: the distributed unit of the serving node transmits a (2-b-2)-th message to the central unit (or the control plane part of the central unit or the user plane part of the central unit) of the serving node. The contents included in this message may be referred to the fourth message in step 2-2 above, such as the fourth information related to configured grant.

Step 2-b-3: the serving node (or the central unit of the serving node, or the control plane part of the central unit of the serving node, or the user plane part of the central unit of the serving node) transmits a (2-b-3)-th message to the anchor node (or the central unit of the anchor node, or the control plane part of the central unit of the anchor node, or the user plane part of the central unit of the anchor node), where the contents included in this message may be referred to the second message in step 1-2 above, such as the second information related to configured grant. In an example, the message may be a RETRIEVE UE CONTEXT REQUEST message, and in another example, the message may be a newly defined message.

Step 2-b-4: the anchor node (or the central unit of the anchor node, or the control plane part of the central unit of the anchor node, or the user plane part of the central unit of the anchor node) transmits a (2-b-4)-th message to the serving node (or the central unit of the serving node, or the control plane part of the central unit of the serving node, or the user plane part of the central unit of the serving node). The contents included in this message may be referred to the first message in step 1-1 above, such as the first container related to user messages. In an example, the user messages included in this container will include the "first information related to configured grant". In an example, the (2-b-4)-th message may be a RETRIEVE UE CONTEXT FAILURE message.

Step 2-b-5: the serving node (or the central unit of the serving node, or the control plane part of the central unit of the serving node, or the user plane part of the central unit of the serving node) transmits a (2-b-5)-th message to the user, which is used to configure the user. The contents included in this message may be referred to the fifth message in step 3-1 above. The message may be used to terminate the small data transmission of the user.

Further, when the configuration request is initiated by the anchor node, step 2-b-0 may further be included before the above step 2-b-1: the anchor node (or the central unit of the anchor node, or the control plane part of the central unit of the anchor node, or the user plane part of the central unit of the anchor node) transmits a (2-b-0)-th message to the serving node (or the central unit of the serving node, or the control plane part of the central unit of the serving node, or the user plane part of the central unit of the serving node). The contents included in this message may be referred to the first message in step 1-1 above, such as the first indication information of configured grant request.

The method has the advantages that the serving node may provide the anchor node with the configuration information related to the small data transmission of the user, for assisting the anchor node to generate the message for configuring the user, and provide the configuration for the user to perform the small data transmission.

Figure 18:
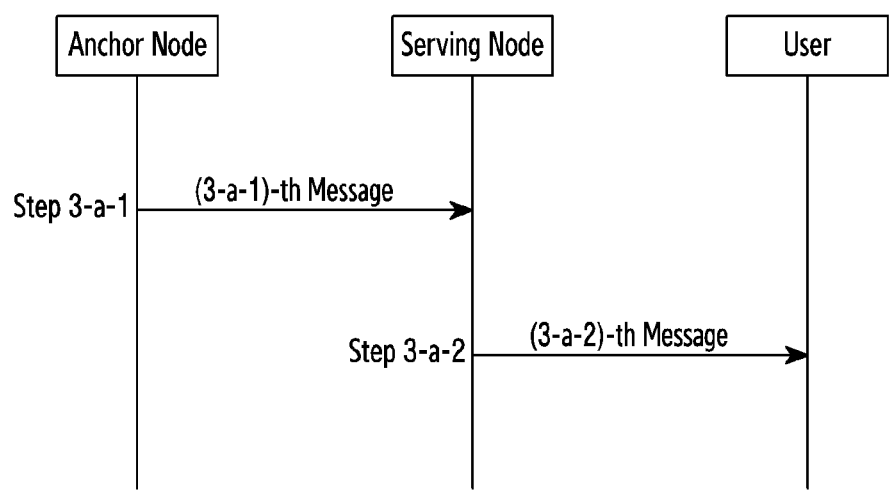
FIGS. 18 and 19 illustrate a procedure of determination of terminating small data transmission according to various embodiments of the disclosure.
Figure 19:
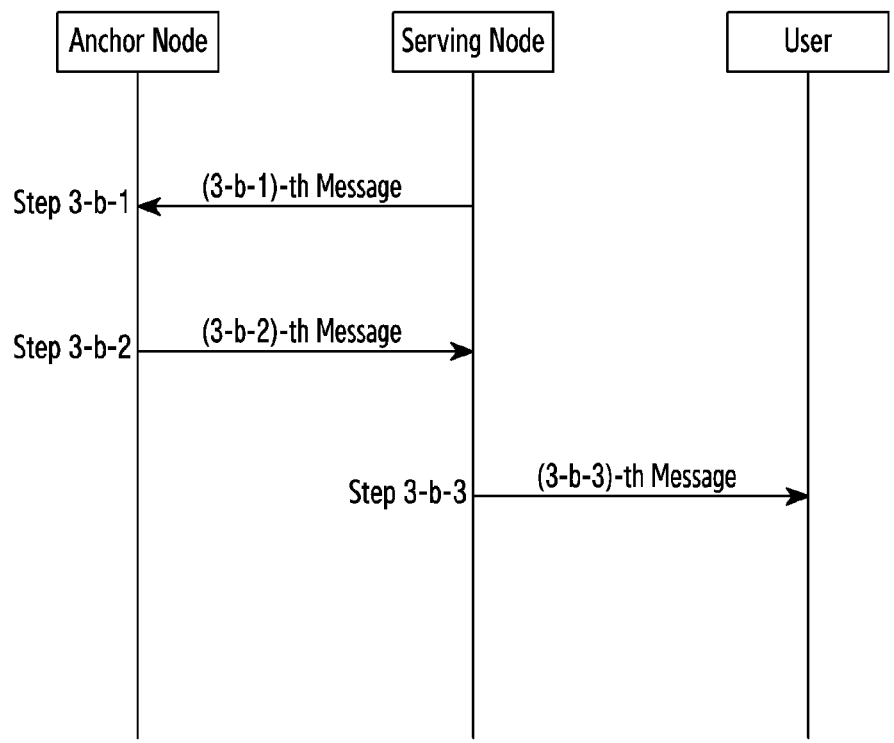

FIGS. 18 and 19 illustrate a procedure of determination of terminating small data transmission according to various embodiments of the disclosure.

At present, there is a technical problem of transmitting a connection release message or determining that the user terminates small data transmission. In the procedure of small data transmission by the user, the network side may transmit a connection release message to the user. The technical problem of this process is that the network side may not know when to transmit the connection release message to the user. If it is transmitted too early, the small data transmission of the user may not be completed normally. If it is transmitted too late, the network side and the user will waste resources unnecessarily. In order to solve this technical problem, the disclosure provides the following possible methods.

Referring to FIG. 18, a method for an anchor node to determine an occasion of transmitting a connection release message (or a user terminating small data transmission) is shown, which includes at least one of the following operations:

Step 3-a-1: the anchor node (or a central unit of the anchor node, or a control plane part of the central unit of the anchor node, or a user plane part of the central unit of the anchor node) transmits a (3-a-1)-th message to a serving node (or a central unit of the serving node, or a control plane part of the central unit of the serving node, or a user plane part of the central unit of the serving node). The contents included in this message may be referred to the first message in step 1-1 above, such as the first indication information of release of the user, the first indication information of termination of small data transmission, or the first time information.

Step 3-a-2: the serving node transmits a (3-a-2)-th message to the user, which is used to release the user. The contents included in this message may be referred to the fifth message in step 3-1 above. An occasion for the serving node to transmit the (3-a-2)-th message may be decided according to the information received in step 3-a-1, such as the first time information, or the first indication information of release of the user/first indication information of termination of small data transmission.

When the serving node includes a central unit and a distributed unit, at least one of the following operations is further included after step 3-a-1:

Step 3-a-1a: the central unit (the control plane part of the central unit or the user plane part of the central unit) of the serving node transmits a (3-a-1a)-th message to the distributed unit of the serving node. The contents included in this message may be referred to the third message in step 2-1 above, such as the second time information, or the indication information of delay transmission.

Step 3-a-1b: the distributed unit of the serving node transmits a (3-a-1b)-th message to the user, where the contents included in this message may be referred to the fifth message in step 3-1 above.

The method has the advantages that the serving node may determine the occasion of transmitting the connection release message or terminating the small data transmission of the user according to the configuration or indication information of the anchor node, thereby avoiding resource waste.

Referring to FIG. 19, a method for a serving node to determine an occasion of transmitting a connection release message (or a user terminating small data transmission) is shown, which includes at least one of the following operations:

Step 3-b-1: the anchor node (or the central unit of the anchor node, or the control plane part of the central unit of the anchor node, or the user plane part of the central unit of the anchor node) transmits a (3-b-1)-th message to the serving node (or the central unit of the serving node, or the control plane part of the central unit of the serving node, or the user plane part of the central unit of the serving node). The contents included in this message may be referred to the first message in step 1-1 above, such as the first indication information of release of the user, the first indication information of termination of small data transmission, or the first indication information of no small data.

Step 3-b-2: the serving node (or the central unit of the serving node, or the control plane part of the central unit of the serving node, or the user plane part of the central unit of the serving node) transmits a (3-b-2)-th message to the anchor node (or the central unit of the anchor node, or the control plane part of the central unit of the anchor node, or the user plane part of the central unit of the anchor node), where the contents included in this message may be referred to the second message in step 1-2 above, such as the second indication information of termination of small data transmission, or the second indication information of no small data.

Step 3-b-3: the serving node transmits a (3-b-3)-th message to the user, which is used to release the user.

The method has the advantages that the serving node may determine the occasion of transmitting the connection release message or terminating the small data transmission of the user according to the configuration or indication information of the anchor node, thereby avoiding resource waste.

Figure 20:
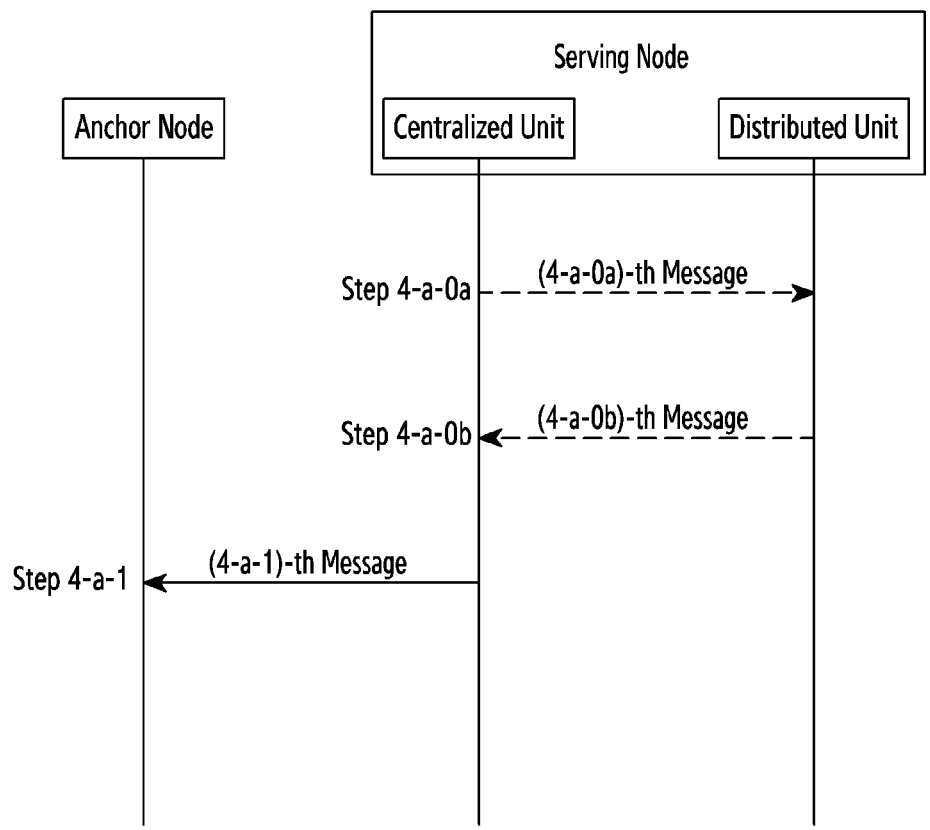
FIG. 20 illustrates a procedure of updating a configuration for a user according to an embodiment of the disclosure.

FIG. 20 illustrates a procedure of updating a configuration for a user according to an embodiment of the disclosure.

At present, there is a technical problem of updating a configuration for a user in an SDT process. In a procedure of small data transmission, a serving node may modify the configuration information for the user. When the small data transmission is terminated, the user will save the updated configuration. However, an anchor node still keeps the configuration before the update of the user. Therefore, the technical problem is that the configuration at the user side is inconsistent with that at the network side, so that the user may not be correctly configured after the user transmits small data or enters the connected state again. In order to solve this problem, the disclosure provides a method for updating the configuration for the user, as shown in FIG. 20, which includes at least one of the following operations:

Step 4-a-1: the serving node (or a central unit of the serving node, or a control plane part of the central unit of the serving node, or a user plane part of the central unit of the serving node) transmits a (4-a-1) message to the anchor node (or a central unit of the anchor node, or a control plane part of the central unit of the anchor node, or a user plane part of the central unit of the anchor node), where the contents included in this message may be referred to the second message in step 1-2 above, such as the first lower layer configuration information. The anchor node may obtain the latest configuration for the user through this procedure.

When the serving node includes a central unit and a distributed unit, at least one of the following operations may further be included before step 4-a-1:

Step 4-a-0a: the central unit of the serving node (or a control plane part of the central unit of the serving node or a user plane part of the central unit of the serving node) transmits a (4-a-0a)-th message to the distributed unit of the serving node, where the contents included in this message may be referred to the third message in step 2-1 above, such as the first indication information of lower layer configuration request.

Step 4-a-0b: the distributed unit of the serving node transmits a (4-a-0b)-th message to the central unit of the serving node (or the control plane part of the central unit of the serving node or the user plane part of the central unit of the serving node). The contents included in this message may be referred to the fourth message in step 2-2 above, such as the second lower layer configuration information.

The above procedure has the advantages that the serving node may obtain the latest configuration for the user and transmit the configuration to the anchor node, which may assist the anchor node to keep the same configuration as the user so as to continue to serve the user.

Figure 21:
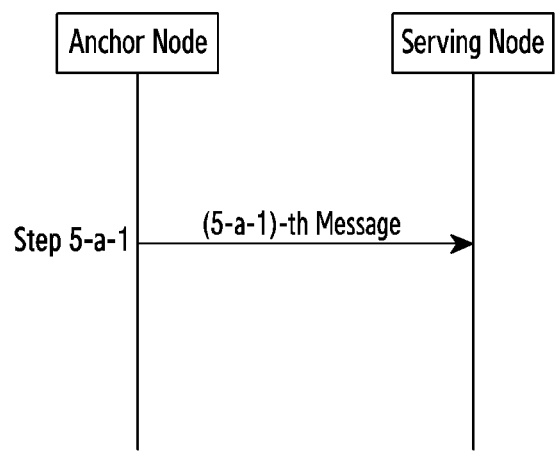
FIG. 21 illustrates a procedure of release of an SDT configuration according to an embodiment of the disclosure.

FIG. 21 illustrates a procedure of release of an SDT configuration according to an embodiment of the disclosure.

At present, there is a problem of releasing an SDT configuration. In a procedure of small data transmission, the user may lose connection with a cell (such as link failure and cell reselection). When the user reconnects to a network (for example, through a reestablishment procedure or a connection resume procedure by the user), the user may continue to transmit small data or enter the connected state. However, when the user reconnects to the network, the network side may not recognize that the user is a user performing the small data transmission previously, so the network side will continue to maintain resources that the user has performed small data transmission previously, which brings about the technical problem that the network side will configure duplicate resources for the user, resulting in unnecessary resource waste. In order to solve this problem, the disclosure provides a method to assist the network side to identify the user, as shown in FIG. 21, which includes at least one of the following operations:

Step 5-a-1: an anchor node (or a central unit of the anchor node, or a control plane part of the central unit of the anchor node, or a user plane part of the central unit of the anchor node) transmits a (5-a-1)-th message to a serving node (or a central unit of the serving node, or a control plane part of the central unit of the serving node, or a user plane part of the central unit of the serving node), where the contents included in this message may be referred to the first message in step 1-1 above, such as the identification information related to the user. The information may assist the serving node to know whether the newly accessed user is a user that is being served by the serving node (such as performing the small data transmission).

Step 5-a-1 may further include at least one of the following operations:

Step 5-a-0a: the user transmits a (5-a-0a)-th message to the serving node, which is used for the user to request to access the network, where the contents included in this message may be referred to the sixth message in step 3-2 above.

Step 5-a-0b: the serving node transmits a (5-a-0b)-th message to the anchor node, where the contents included in this message may be referred to the sixth message in step 3-2 above.

Through the above procedure, if the serving node may identify that a newly accessed user is a user that is being served, the network side may release or reuse some resources serving the user (such as resources reserved by the network for the newly accessed user before serving the user).

The above procedure has the advantages that the network side may know whether the user is a user that is being served, so as to determine the allocation of user resources and reduce unnecessary resource waste.

Figure 22:
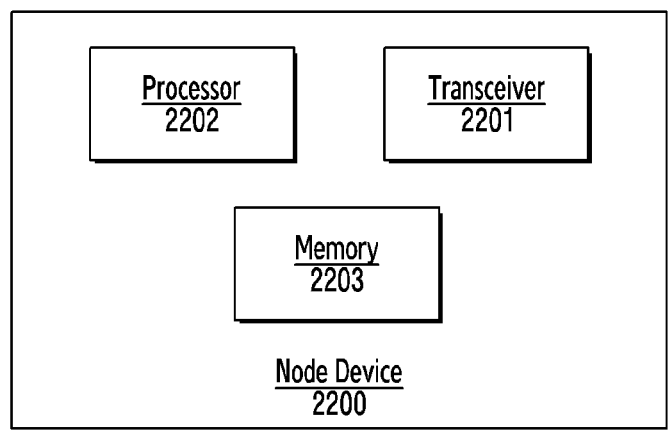
FIG. 22 illustrates a block diagram of a configuration of a node device according to various embodiments of the disclosure.

FIG. 22 illustrates a block diagram of a configuration of a node device according to an embodiment of the disclosure. The node device includes at least one of the various nodes described herein.

Referring to FIG. 22, a node device 2200 according to various embodiments of the disclosure may include a transceiver 2201, a processor 2202 and a memory 2203. For example, the transceiver 2201 may be configured to transmit and receive signals. For example, the processor 2202 may be coupled to the transceiver 2201. For example, the memory 2203 may store instructions executable by the processor 2202 that, when executed by the processor 2202, cause the processor 2202 to perform the aforementioned methods.

Figure 23:
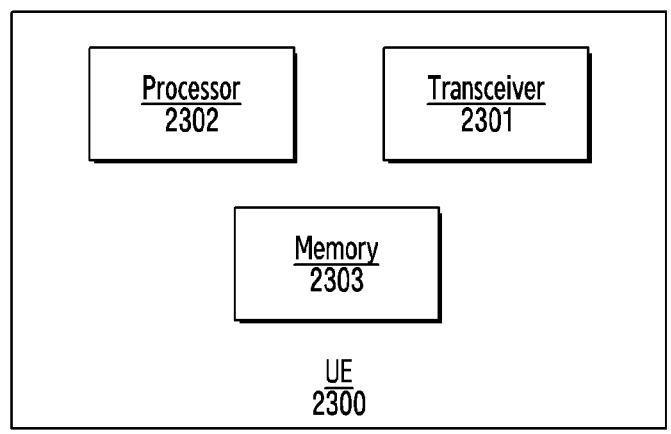
FIG. 23 illustrates a block diagram of a configuration of a UE according to various embodiments of the disclosure.

FIG. 23 illustrates a block diagram of a configuration of a UE according to an embodiment of the disclosure.

Referring to FIG. 23, a UE 2300 according to various embodiments of the disclosure may include a transceiver 2301, a processor 2302 and a memory 2303. For example, the transceiver 2301 may be configured to transmit and receive signals. For example, the processor 2302 may be coupled to the transceiver 2301. For example, the memory 2303 may store instructions executable by the processor 2302 that, when executed by the processor 2302, cause the processor 2302 to perform the aforementioned methods.

Although the UE is illustrated as having separate functional blocks for convenience of explanation, the configuration of the UE 2300 is not limited to this. For example, the UE 2300 may include a communication unit including a transceiver and a processor. The UE 2300 may communicate with at least one network node via the communication unit.

In accordance with an aspect of the disclosure, a method performed by a gNB-CU (gNodeB-centralized unit) in a wireless communication system is provided. The method includes receiving a first message from a gNB-DU (distributed unit), wherein the first message comprises information of termination of small data transmission (SDT) for a user equipment (UE).

In accordance with an aspect of the disclosure, the method further includes transmitting a second message to a last serving gNB, wherein the second message comprises the information of the termination of the SDT for the UE.

In accordance with an aspect of the disclosure, wherein the second message is associated with the SDT without UE context relocation.

In accordance with an aspect of the disclosure, wherein the first message comprises at least one of identification information related to the UE, indication information related to the UE. information related to security.

In accordance with an aspect of the disclosure, wherein the first message comprises at least one of a container related to messages of the UE, information related to context of the UE, indication information of configured grant request, indication information of release of the UE, and time information.

In accordance with an aspect of the disclosure, a method performed by a gNB-DU (gNodeB-distributed unit) in a wireless communication system is provided. The method includes transmitting a first message to a gNB-CU (centralized unit), wherein the first message comprises information of termination of small data transmission (SDT) for a user equipment (UE).

In accordance with an aspect of the disclosure, wherein a second message for a last serving gNB is transmitted from the gNB-CU, wherein the second message comprises the information of the termination of the SDT for the UE.

In accordance with an aspect of the disclosure, wherein the second message is associated with the SDT without UE context relocation.

In accordance with an aspect of the disclosure, wherein the first message comprises at least one of identification information related to the UE, indication information related to the UE, information related to security.

In accordance with an aspect of the disclosure, wherein the first message comprises at least one of a container related to messages of the UE, information related to context of the UE, indication information of configured grant request, indication information of release of the UE, and time information.

According to embodiments of the disclosure, at least a part of node devices and UE (e.g., modules or their functions) or methods (e.g., operations or steps) may be implemented as instructions stored in a computer-readable storage medium (e.g., memory) in the form of program modules, for example. When executed by a processor or controller, the instructions may allow the processor or controller to perform corresponding functions. The computer-readable media may include, for example, hard disk, floppy disk, magnetic media, optical recording media, DVD, magneto-optical media. The instructions may include code created by a compiler or code executable by an interpreter. The module or UE according to various embodiments of the disclosure may include at least one or more of the above components, some of which may be omitted, or other additional components. Operations performed by modules, programming modules or other components according to various embodiments of the disclosure may be performed sequentially, in parallel, repeatedly or heuristically, or at least some operations may be performed in a different order or omitted, or other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a central unit (CU) of a first base station in a wireless communication system, the method comprising:
 receiving, from a distributed unit (DU) of the first base station, a first message including information for requesting a termination of a first small data transmission (SDT) for a user equipment (UE) in a radio resource control (RRC) inactive state, wherein the information includes an indication for an uplink (UL) data size larger than a size for the first SDT; and
 performing the termination of the first SDT for the UE based on the information included in the first message,
 wherein a RRC resume procedure for the UE is based on the indication included in the information.

2. The method of claim 1, further comprising:
 receiving, from a second base station, a second message including second information for requesting a termination of a second SDT,
 wherein the second SDT corresponds to a random access (RA) based SDT without UE context relocation, and
 wherein the first base station corresponds to a last serving next generation node B (gNB) for the UE and the second base station corresponds to a current serving gNB for the UE.

3. The method of claim 1, wherein the first SDT corresponds to a configured grant (CG) SDT based on a CG configuration.

4. A central unit (CU) of a first base station in a wireless communication system, the CU comprising:
 at least one transceiver;
 at least one processor communicatively coupled to the at least one transceiver; and
 at least one memory, communicatively coupled to the at least one processor, storing instructions executable by the at least one processor individually or in any combination to cause the CU to:
 receive, from a distributed unit (DU) of the first base station, a first message including information for requesting a termination of a first small data transmission (SDT) for a user equipment (UE) in a radio resource control (RRC) inactive state, wherein the information includes an indication for an uplink (UL) data size larger than a size for the first SDT, and
 perform the termination of the first SDT for the UE based on the information included in the first message,
 wherein a RRC resume procedure for the UE is based on the indication included in the information.

5. The CU of claim 4,
 wherein the instructions further cause the CU to:
 receive, from a second base station, a second message including second information for requesting a termination of a second SDT, wherein the second SDT corresponds to a random access (RA) based SDT without UE context relocation, and wherein the first base station corresponds to a last serving next generation node B (gNB) for the UE and the second base station corresponds to a current serving gNB for the UE.

6. The CU of claim 4, wherein the first SDT corresponds to a configured grant (CG) SDT based on a CG configuration.

7. A method performed by a distributed unit (DU) of a first base station in a wireless communication system, the method comprising:

identifying that a termination of a first small data transmission (SDT) is required for a user equipment (UE) in a radio resource control (RRC) inactive state; and transmitting, to a central unit (CU) of the first base station, a first message including information for requesting the termination of the first SDT, wherein the information includes an indication for an uplink (UL) data size larger than a size for the first SDT, wherein the termination of the first SDT is based on the information included in the first message, and wherein a RRC resume procedure for the UE is based on the indication included in the information.

8. The method of claim 7, wherein a termination of a second SDT corresponding to a random access (RA) based SDT without UE context relocation is based on a second message including second information for requesting the termination of the second SDT.

9. The method of claim 8, wherein the first base station corresponds to a last serving next generation node B (gNB) for the UE.

10. The method of claim 7, wherein the first SDT corresponds to a configured grant (CG) SDT based on a CG configuration.

11. A distributed unit (DU) of a first base station in a wireless communication system, the DU comprising:

at least one transceiver;

at least one processor communicatively coupled to the at least one transceiver; and at least one memory, communicatively coupled to the at least one processor, storing instructions executable by the at least one processor individually or in any combination to cause the DU:

identify that a termination of a first small data transmission (SDT) is required for a user equipment (UE) in a radio resource control (RRC) inactive state, and transmit, to a central unit (CU) of the first base station, a first message including information for requesting the termination of the first SDT, wherein the information includes an indication for an uplink (UL) data size larger than a size for the first SDT, wherein the termination of the first SDT is based on the information included in the first message, and wherein a RRC resume procedure for the UE is based on the indication included in the information.

12. The DU of claim 11, wherein a termination of a second SDT corresponding to a random access (RA) based SDT without UE context relocation is based on a second message including second information for requesting the termination of the second SDT, and wherein the first base station corresponds to a last serving next generation node B (gNB) for the UE.

13. The DU of claim 11, wherein the first SDT corresponds to a configured grant (CG) SDT based on a CG configuration.

* * * * *